(12) United States Patent
Iwase

(10) Patent No.: US 6,222,109 B1
(45) Date of Patent: Apr. 24, 2001

(54) MUSIC PERFORMANCE TRAINING APPARATUS AND RECORDING MEDIUM HAVING A TRAINING PROGRAM STORED THEREON

(75) Inventor: Hiroshi Iwase, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/586,127

(22) Filed: Jun. 2, 2000

(30) Foreign Application Priority Data

Jun. 18, 1999 (JP) .................................................. 11-173185

(51) Int. Cl.[7] .................................................. G09B 15/02
(52) U.S. Cl. .......................... 84/477 R; 84/464 A; 84/478
(58) Field of Search .............................. 84/464 A, 477 R, 84/478

(56) References Cited

U.S. PATENT DOCUMENTS

| | | |
|---|---|---|
| 3,744,366 | 7/1973 | Del Castillo . |
| 3,885,490 | 5/1975 | Gullickson . |
| 3,958,487 | 5/1976 | Goldman . |
| 4,040,324 | 8/1977 | Green . |
| 4,307,645 | 12/1981 | Rauchi . |
| 4,314,499 | 2/1982 | Olsen . |
| 4,331,062 | 5/1982 | Rogers . |
| 4,366,741 | 1/1983 | Titus . |
| 4,437,378 | 3/1984 | Ishida et al. . |
| 4,651,612 * | 3/1987 | Matsumoto .................... 84/470 R X |
| 5,069,104 * | 12/1991 | Shibukawa ............................. 84/478 |
| 5,859,382 * | 1/1999 | Funaki .......................... 84/477 R X |
| 5,907,115 * | 5/1999 | Matsunaga et al. ............... 84/477 R |
| 6,011,210 * | 1/2000 | Haruyama et al. ................ 84/470 R |

* cited by examiner

Primary Examiner—Jeffrey Donels
(74) Attorney, Agent, or Firm—Frishauf, Holtz, Goodman, Langer & Chick, P.C.

(57) ABSTRACT

A succession of music note data are provided. Those music note data which partially overlap in duration are corrected so that they completely overlap in duration. The corrected music note data are used for music navigation. As a result, the apparatus can properly guide a player to play chords or operate a plurality of keys at the same time.

7 Claims, 26 Drawing Sheets

| AD | DTIME | EVENT | PITCH |
|---|---|---|---|
| 0 | t1 | NOTE ON | C4 |
| 1 | t2 | NOTE OFF | C4 |
| 2 | t3 | NOTE ON | C4 |
| 3 | 0 | NOTE ON | E4 |
| 4 | 0 | NOTE ON | G4 |
| 5 | t4 | NOTE OFF | C4 |
| 6 | 0 | NOTE OFF | E4 |
| 7 | 0 | NOTE OFF | G4 |
| ⋮ | ⋮ | ⋮ | ⋮ |
|  |  | END |  |

| SYMBOL | APPLICATION | CONTENT |
|---|---|---|
| T1 | REAL TIME REGISTER | |
| T2 | DELTA TIME REGISTER | |
| LF | MUSIC LOAD FLAG | 1: LOAD |
| MODE | MODE REGISTER | 0: MANUAL, 1: LESSON 1, 2: LESSON 2, |
| STF | START FLAG | 1: START NAVIGATION, 0: STOP NAVIGATION |
| AD | ADDRESS REGISTER | MUSIC DATA ADDRESS |
| TA | TIME REGISTER | TURN-ON TIME OF LED |
| TB | TIME REGISTER | KEY-ON TIME |
| BUFA | BUFFER | FOR NAVIGATION |
| BUFB | BUFFER | KEY-ON/OFF |
| n | POINTER | KEY NUMBER |
| k | POINTER | BUFA ADDRESS |
| m | POINTER | BUFB ADDRESS |
| TC | TIME REGISTER | TURN-OFF TIME OF LED |
| TD | TIME REGISTER | KEY-OFF TIME |
| T3 | CHECK REGISTER | |
| T4(m) | CHECK REGISTER | |
| HF(m) | CHECK FLAG | 1: OK, 0: NG |

FIG.3

MUSIC PERFORMANCE TRAINING APPARATUS AND RECORDING MEDIUM HAVING A TRAINING PROGRAM STORED THEREON

BACKGROUND OF THE INVENTION

The present invention relates to an apparatus for training music performance and record media of music performance training program stored thereon.

A music performance training apparatus prevails which has a music navigation feature (navigator) for guiding a user to train or practice music performance. For instance, in keyboard instruments having such a navigator, a light emitting element such as an LED, is provided in each operation member or key of the keyboard. As music note data proceeds, the navigator turns on a light emitting element of a key corresponding to a note to be played, thus informing a user or player of a key to be pressed. Some of the keyboard instruments with the navigator have a plurality of lesson modes, for instance first and second lesson modes, in which a player practices music performance. In the first lesson mode, the navigator checks timings of key-on operation only. Thus a player is trained to press keys at correct timings without worrying about selecting and pressing correct keys or light emitting keys. In the second lesson mode, the navigator checks both timings of key-on operation and which keys are operated to train a player to press correct keys at proper timings.

The prior art keyboard instrument having the first and second lesson modes has the following disadvantages in connection with practicing performance of a music piece including chords.

A general-purpose music data form, such as a standard MIDI file (SMF) uses a serial arrangement of event data such as note-on and note-off, even for chords that must be played or key-pressed simultaneously, so that lighting timings of chord keys cannot coincide. Sometimes, members of a chord may artificially be played or key-pressed with subtle time differences.

A player generally takes a plurality of notes having overlapped duration on a music staff as a chord to be played simultaneously. In the first lesson mode, the player finds it difficult to play or key-press a chord with proper timing since the navigator checks the number of keys for the chord. In the second lesson mode, the navigator compares the erroneous timings of chord members according to music data of an SMF format with those played by the player, so that it is hard for the player to learn proper chord performance.

SUMMARY OF THE INVENTION

An object of the invention is to provide a music performance training apparatus which can properly guide a player to play chords, even using, as music data in an SMF format, serial data for directing operation of operation members according to which respective event data are serially arranged with time differences.

A further object of the invention is to provide a recording medium having a music performance training computer program stored thereon which can properly guide a player to play chords, even using such music data.

In accordance with a first aspect of the invention, there is provided an apparatus for training music performance which comprises:

a plurality of operation members corresponding to a plurality of pitches;

a plurality of light emitting elements corresponding to the plurality of operation members;

music data providing means for providing a succession of note data each representative of pitch, note-on timing and duration;

data correcting means for correcting those note data in the succession of note data which partially overlap in duration so as to completely overlap in duration by correcting their note-on timings and/or durations; and control means for controlling those light emitting elements in the plurality of light emitting elements which correspond to pitches of the corrected note data so as to emit light at note-on timings of the corrected note data.

With this arrangement, even when serial data, such as SMF, including event data serially arranged with time differences are used as music data for directing operation of operation members, the apparatus of the invention can properly guide a player to practice music performance including simultaneous operation of a plurality keys for chords.

A further aspect of the invention provides a recording medium that is readable by a computer and on which a program for music performance training is recorded, the program comprising the steps of:

providing a succession of note data each representative of pitch, note-on timing and duration;

correcting those note data in the succession of note data which partially overlap in duration so as to completely overlap in duration; and controlling, in a plurality of light emitting elements corresponding to a plurality of pitches, those light emitting elements corresponding to pitches of the corrected note data so as to emit light at note-on timings of the corrected note data.

BRIEF DESCRIPTION OF THE DRAWINGS

FIG. 3 shows registers and flags provided in RAM in FIG. 1;

DETAILED DESCRIPTION OF PREFERRED EMBODIMENTS

The invention will now be described in more detail with respect to the first and second embodiments of the music performance training apparatus of the invention, as applied to a keyboard instrument, taken in conjunction with the accompanying drawings.

Figure 1:
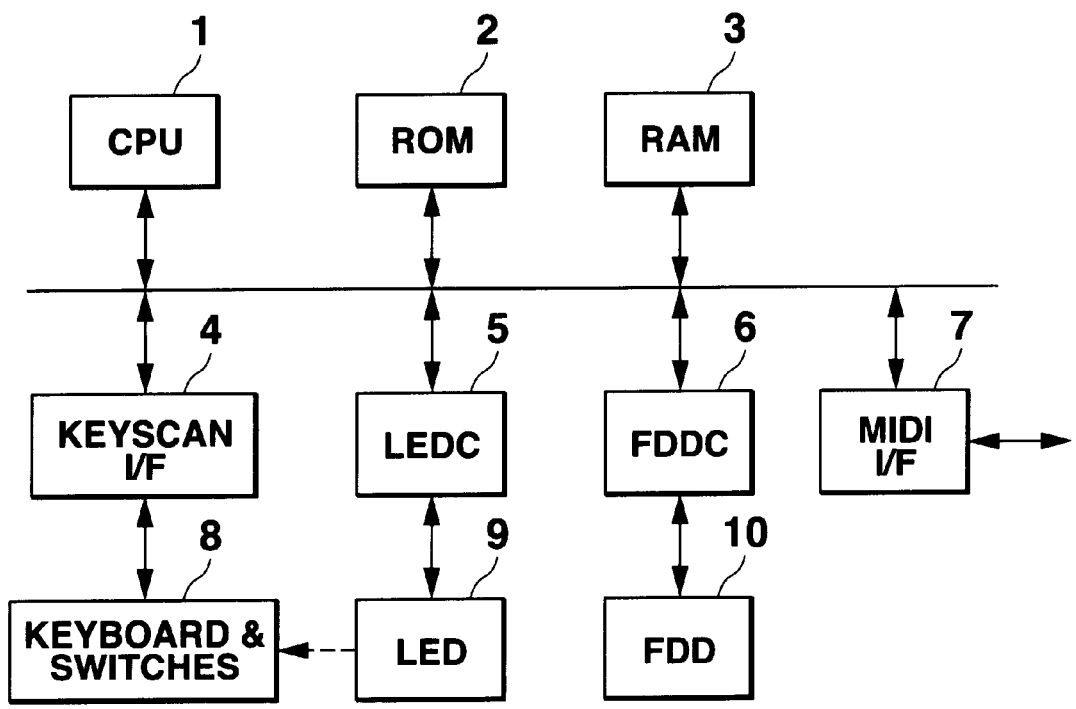
FIG. 1 is a block diagram of a system arrangement of a music performance training apparatus used in embodiments of the invention.

FIG. 1 shows a system arrangement of the keyboard instrument in accordance with the embodiments of the invention. CPU1 is connected to ROM2, RAM3, key scan interface 4, LED controller (LEDC)5, floppy disk drive controller (FDDC)6 and MIDI interface 7 via a system bus. ROM2 stores a program for music performance training which is run by CPU1. RAM3 temporarily stores data in process of CPU1. Key scan interface 4 is connected to a keyboard 8 including switches and a musical keyboard having a plurality of operation members (keys) to scan the state of keys and switches and send the scan results to CPU1. LDC5 controls turning on or off of light emitting diodes (LED)9, as light emitting elements, provided in respective keys. FDDC6 controls floppy disk drive (FDD)10. MIDI interface 7 receives MIDI data from an external MIDI device to load them into RAM 3 and sends MIDI data produced by CPU1 to an external MIDI tone generator.

Figures 2A, 2B:
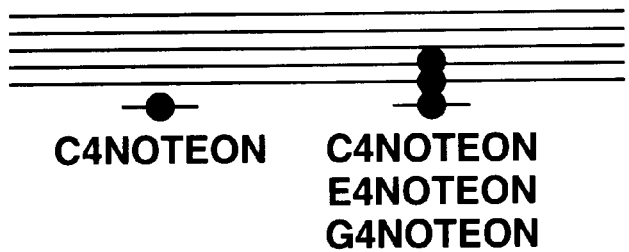
FIG. 2A shows a format of music data used for music performance training in the embodiments of the invention.
FIG. 2B shows a staff corresponding to the music data in FIG. 2A.

FIG. 2A shows an SMF (standard MIDI file) music data format of the notes shown in FIG. 2B. In FIG. 2A, each note data at an address AD includes event data (EVENT), such as NOTE ON and NOTE OFF, delta or remaining time (DTIME) to the event and pitch data. Other event data such as velocity may be included, but are not shown in FIG. 2A for simplicity. The NOTE ON event data at addresses 2, 3 and 4 constitute chord notes having, here, the same note-on timing. It is noted that these event data are serially arranged. The music data end with a predetermined end mark.

FIG. 3 shows registers and flags used in the embodiments of the invention. T1 indicates a real time register. During the navigation, the real time register T1 is incremented each time when a timer interrupt occurs at predetermined time intervals of, say, 5–10 milliseconds. T2 indicates a delta time register T2 is updated to a new delta time when the music note data address is advanced. LF indicates a music load flag. With the music load flag LF of "1", the navigator loads music data into RAM. MODE indicates a mode register. The mode register MODE="0" indicates a manual performance mode in which a player performs music without the navigation. The MODE="1" indicates a first lesson mode, and the MODE=2 indicates a second lesson mode. The lesson modes will be described later. STF indicates a start flag. When the start flag STF is set to "1", the navigation starts. The navigation stops by resetting the start flag STF to "0". AD indicates an address register pointing to note data address.

TA indicates a time register. The time register TA is loaded with turn-on timing of LED. TB indicates a time register. The time register TB is loaded with key-on timing. BUFA is a buffer for navigation. BUFB is a buffer for key-on/off. Pointers n, k and m point to a key number, an area in buffer BUFA and an area in buffer BUFB, respectively. Time register TC is loaded with turn-off timing of LED. Time register TD is loaded with key-off timing. T3 is a performance check register. Using the value of the performance checks register T3, the navigator check whether the musical performance is good or not. T4 (m) is a performance check register used in the second embodiment of the invention. HF(m) is a performance check register used in the second embodiment. The registers and flags used in the embodiments will further be described later.

Figure 4:
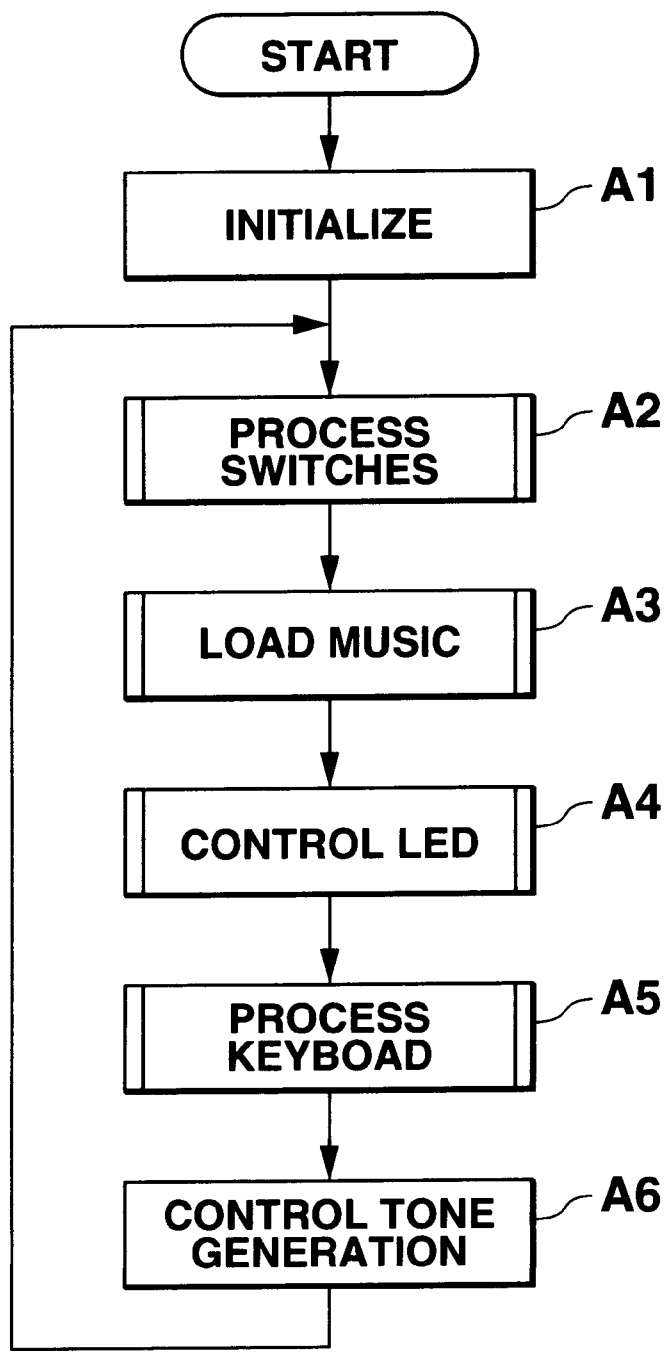
FIG. 4 is a flow chart showing the main routine of CPU in accordance with the embodiments of the invention.
Figure 5:
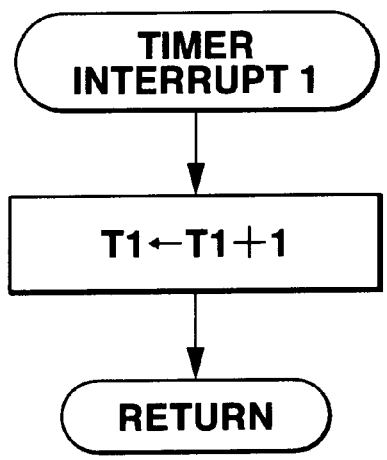
FIG. 5 is a flow chart of a time interrupt 1 in accordance with the embodiments of the invention.
Figure 6:
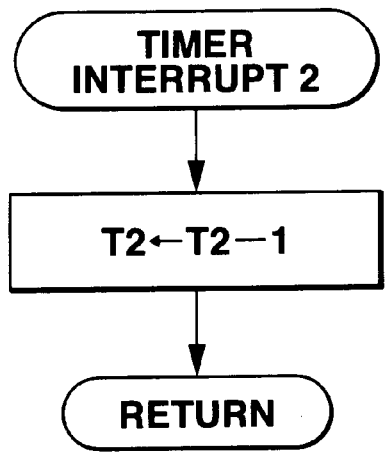
FIG. 6 is a flow chart of a timer interrupt 2 in accordance with the embodiments of the invention.

The operation of the first embodiment of the music performance training apparatus is now described with reference to flow charts showing the control operations of CPU1. FIG. 4 is a flow chart of a main routine run by CPU1. After initializing the system (A1), CPU1 repeats a loop of process switches (S2), load music (A3), control LED (A4), process keyboard (A5) and control tone generation (A6). FIG. 5 shows a timer interrupt 1 routine. At predetermined time intervals (e.g., 5–10 milliseconds), the routine increments the real time register T1 for counting real time. FIG. 6 shows a timer interrupt 2 routine. At predetermined time intervals, the timer interrupt 2 routine decrements the delta time register T2.

Figure 7:
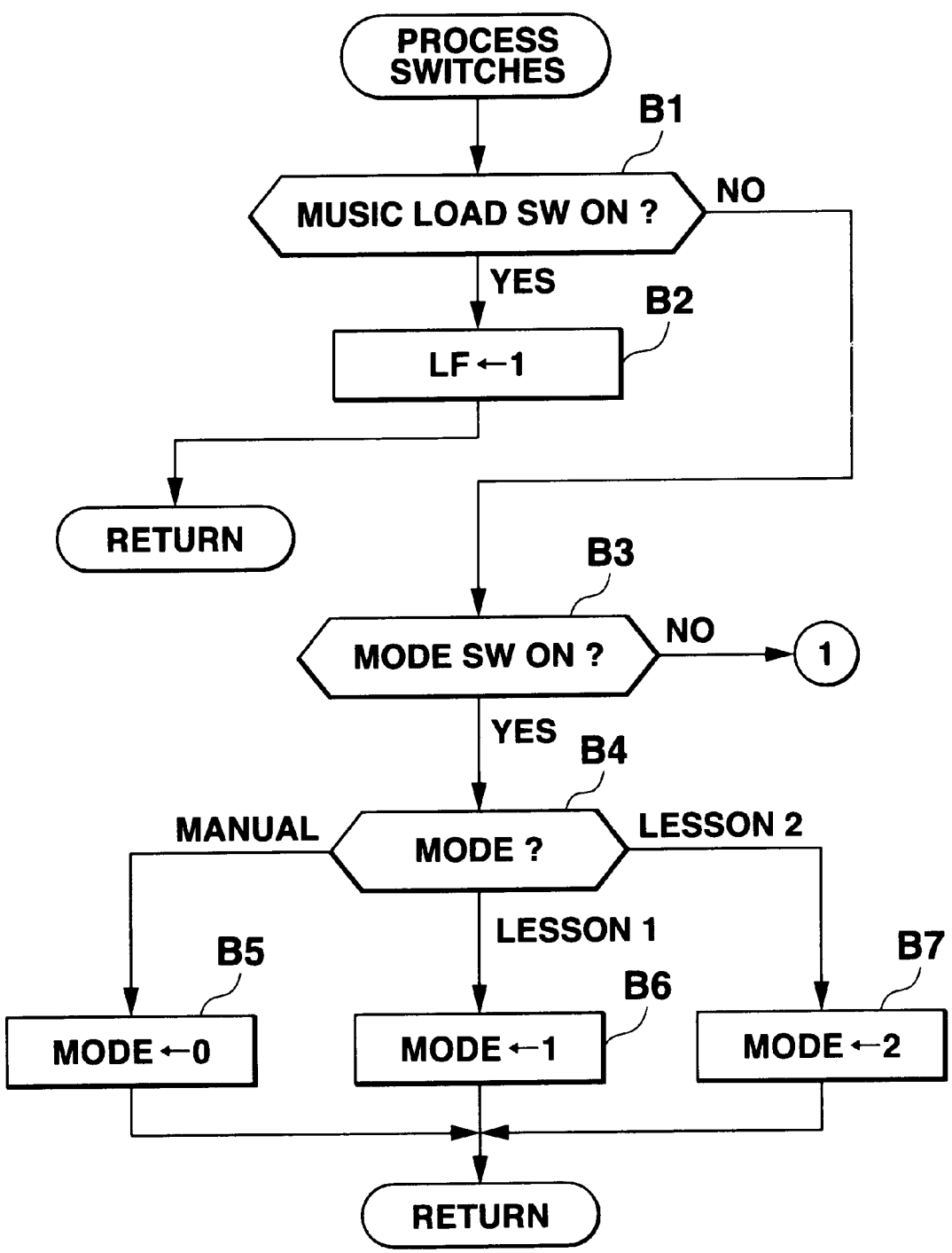
FIGS. 7 and 8 are flow charts of a process switches routine in accordance with the embodiments of the invention.
Figure 8:
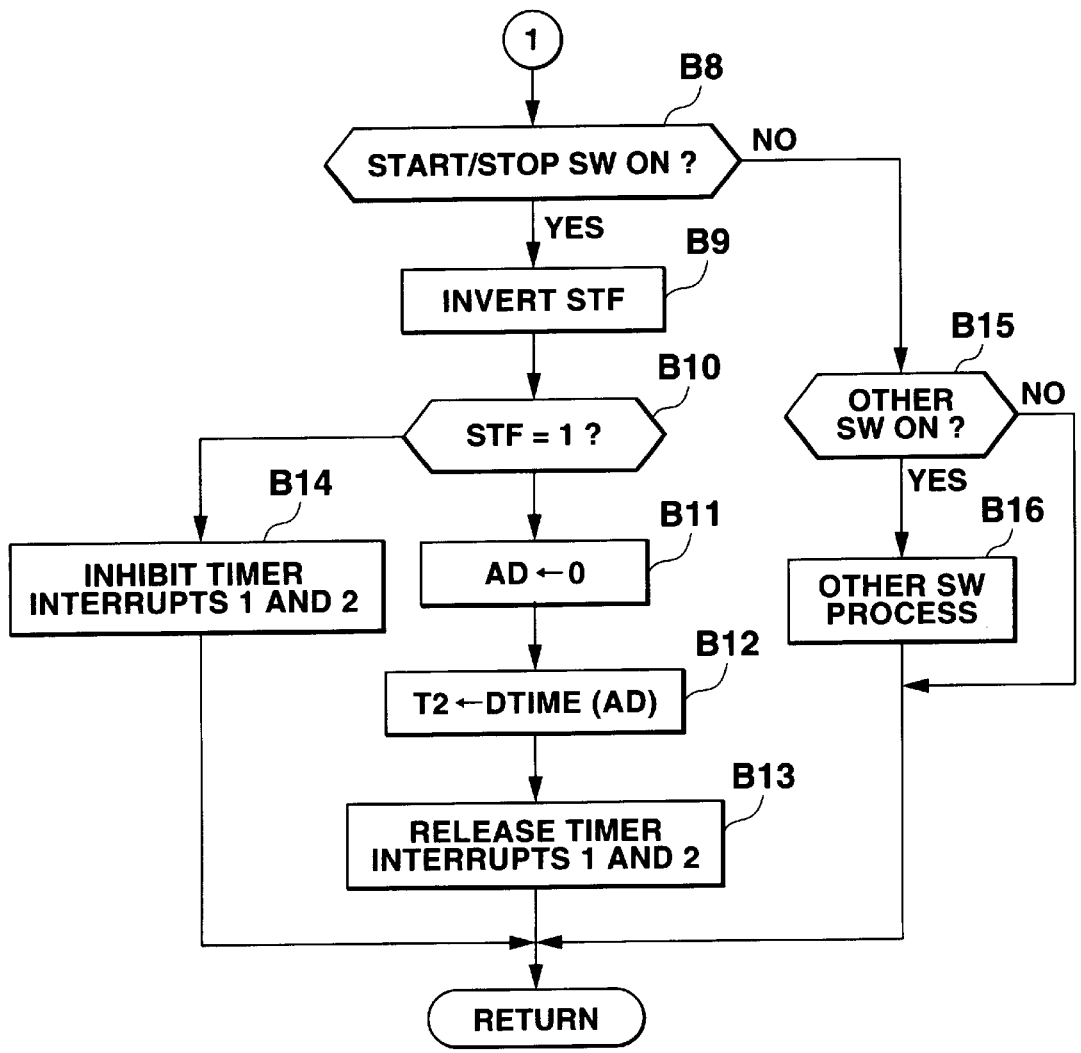

FIGS. 7 and 8 show flow charts of the process switches routine A2 in FIG. 4. Block B1 checks if the music load switch is turned on. In the affirmative, block B2 sets the music load flag LF to "1", and the routine A2 returns to the main routine. In the negative, block B3 checks if a mode switch is turned on. In the affirmative, block B4 determines the mode now selected. If the selected mode is the manual mode (normal performance mode), block B5 sets the mode register MODE to "0". For the first lesson mode, block B6 sets the register MODE to "1". In the case of the second lesson mode, block B7 sets the register MODE to "2". Having set the mode register MODE the process switches routine A2 returns to the main routine.

When neither the music load switch or mode switch is turned on, block B8 in FIG. 8 checks if the start/stop switch is turned on. In the affirmative, the block B9 changes or inverts the start flag STF. Block B10 checks if the inverted flag STF is "1", indicative of start navigation. If STF=1, block B11 initializes the address register AD to "0" so as to point to the start or first address of music data. Block B12, sets the register T2 to the delta time DTIME (AD) at the start address. Block B13 releases the timer interrupts 1 and 2. Then the process switches routine A2 returns to the main routine.

If block B10 finds STF=0, indicative of stop navigation, block B14 inhibits timer interrupts 1 and 2. Then the process switches routine A2 returns to the main routine. When some of the above switches is turned on, block B15 checks if any of the switches is turned on. In the affirmative, block B16 performs the process corresponding to the turned-on switch. Then the process switches routine A2 returns to the main routine.

Figure 9:
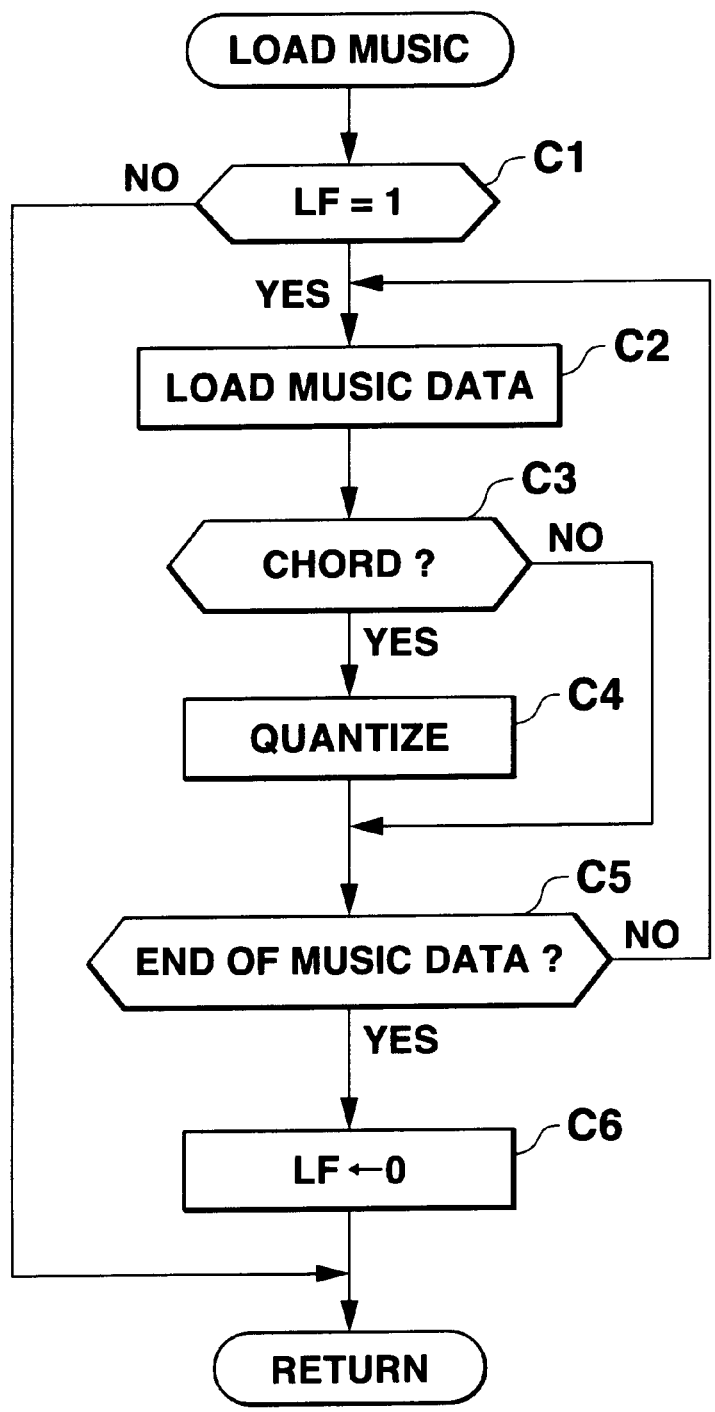
FIG. 9 is a flow chart of a load music routine in accordance with the embodiments of the invention.

FIG. 9 is a flow chart of the load music routine A3 in the main routine of FIG. 4. Block C1 checks if the music load flag LF is set to "1", indicative of load music. If LF=0, the routine A3 directly returns to the main routine since load music is not required. If LF=1, block C2 loads music data. The music data to be loaded may be supplied by either a floppy disk via FDDC6 and FDD10 in FIG. 1, or an external MIDI device (not shown) via the MIDI interface 7.

Figure 10:
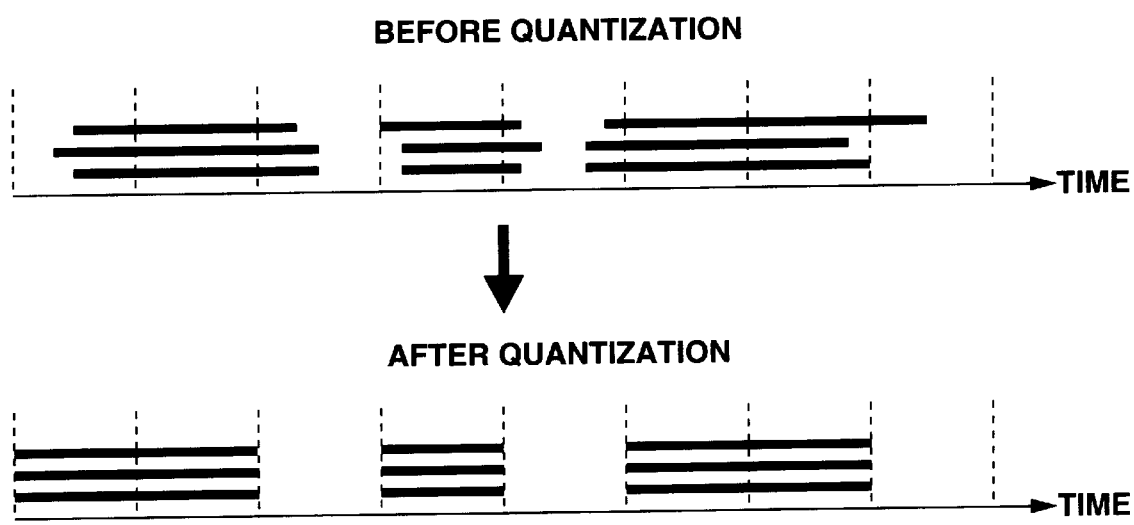
FIG. 10 illustrates how chords are quantized in accordance with the invention.

Block C3 checks if the loaded music data includes a chord. In the affirmative, block C4 quantizes durations of the chord notes. More specifically, the block C4 corrects those notes which partially overlap in duration so as to completely overlap in duration, thus making the corrected music data for navigation. As shown in FIG. 10, before quadization, chord notes have slightly different note-on and/or note-off timings. After the quantization, the note-on and note-off timings of the chord notes just coincide. Block C5 checks if there remains more music data to be loaded. In the affirmative, the routine returns to block C2 to continue the loading of music data. When the end of music data is detected (C5), the block C6 resets the music load flag LF to "0". Then, the load music routine A3 returns to the main routine.

FIGS. 11 to 14 show flow charts of the control LED routine A4 in the main routine of FIG. 4. Block D1 checks the mode flag MODE. If MODE=0, indicative of manual performance mode, the routine directly returns to the main routine. If MODE=1 or 2, indicative of navigation mode, block D2 checks if STF=1, indicative of start navigation. If STF=0, the routine A4 returns to the main routine. If TF=1, block D3 checks if the time register T2 has reached "0", indicative of event time, via the timer interrupt 2 that decrements T2. If T2≠0, not event time, the control LED routine A4 returns to the main routine.

If T2=0, block D4 checks if the event data at address specified by the register AD is note-on. In the affirmative, block D5 in FIG. 12 sets the pointer k pointing to an area in the buffer BUFA to 1. Block D6 turns on the LED corresponding to the pitch (NOTE) of the note-on event data. Block D7 loads the pitch data of NOTE{EVENT(AD)} of the note-on event data pointed to by AD into an area k of the buffer BUFA. Block D8 increments the pointer k so as to point to the next area of BUFA. Block D9 increments the pointer AD so as to point to the next event data.

Then, block D10 check if the next event data EVENT (AD) is also a note-on event. In the affirmative, block D11 checks if the delta time of the next event data is "0". In the affirmative, the note of the next event data and the note of the previous event data constitute chord notes to be played simultaneously. Thus, the routine returns to block D6 to turn on the corresponding LED. The routine repeats the process of blocks D6–D11 times as the number of many as notes of a chord.

If the next event data is not a note-on event (D10), or if the delta time of the next event data is not "0" (D11), block D12 inhibits timer interrupt 2, thus stopping music note data progression to wait for key-on operation. Block D13 loads the delta time DTIME (AD) of the event data specified by AD into the register T2. Block D14 loads the real time data of T1 into the time register TA. Thus, the time register TA is set to the turn-on timing of LED. Then, the control LED routine A4 returns to the main routine.

Figure 11:
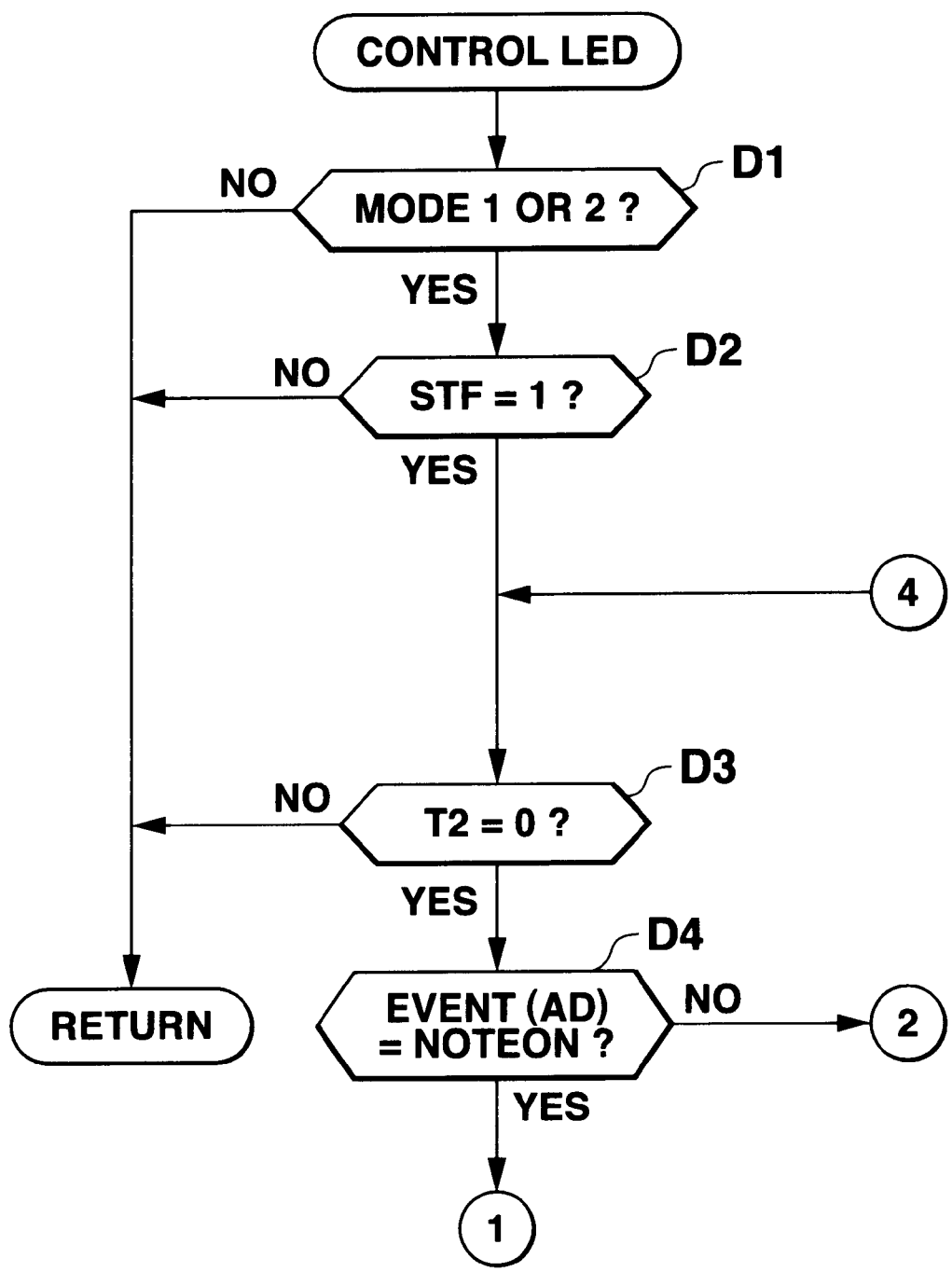
FIGS. 11 to 14 are flow charts of a control LED routine in accordance with the first embodiment of the invention.
Figure 12:
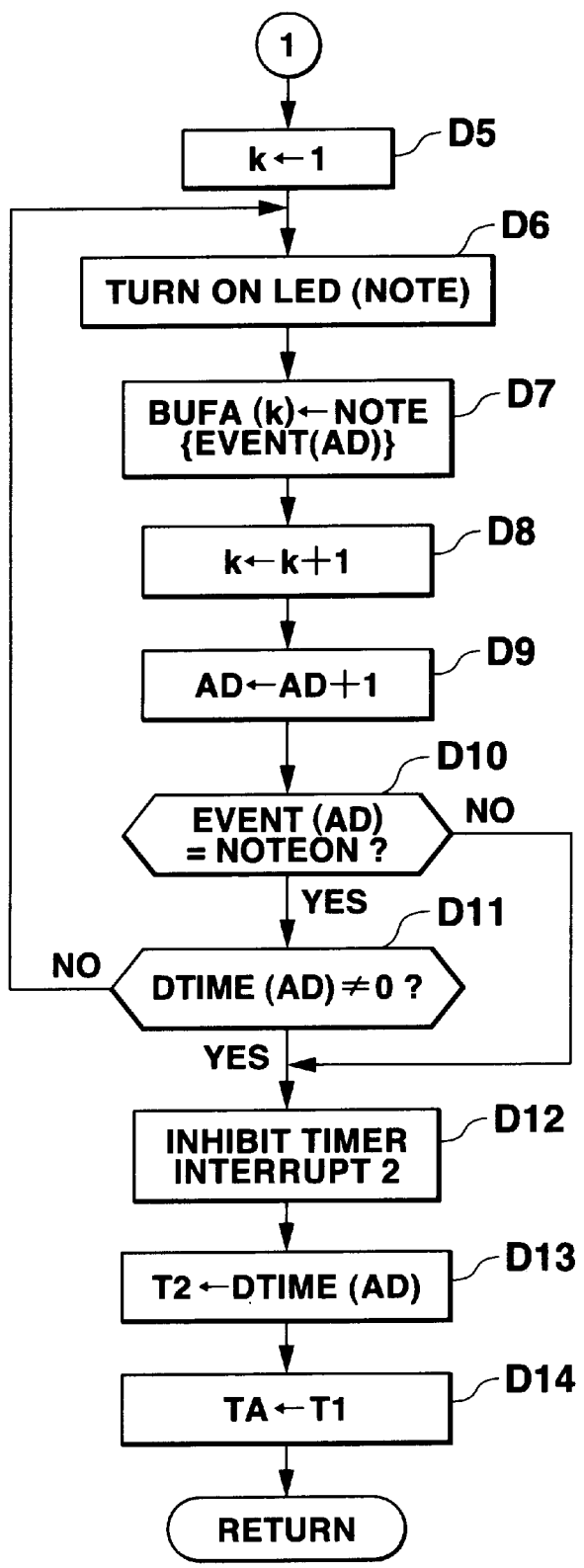
Figure 13:
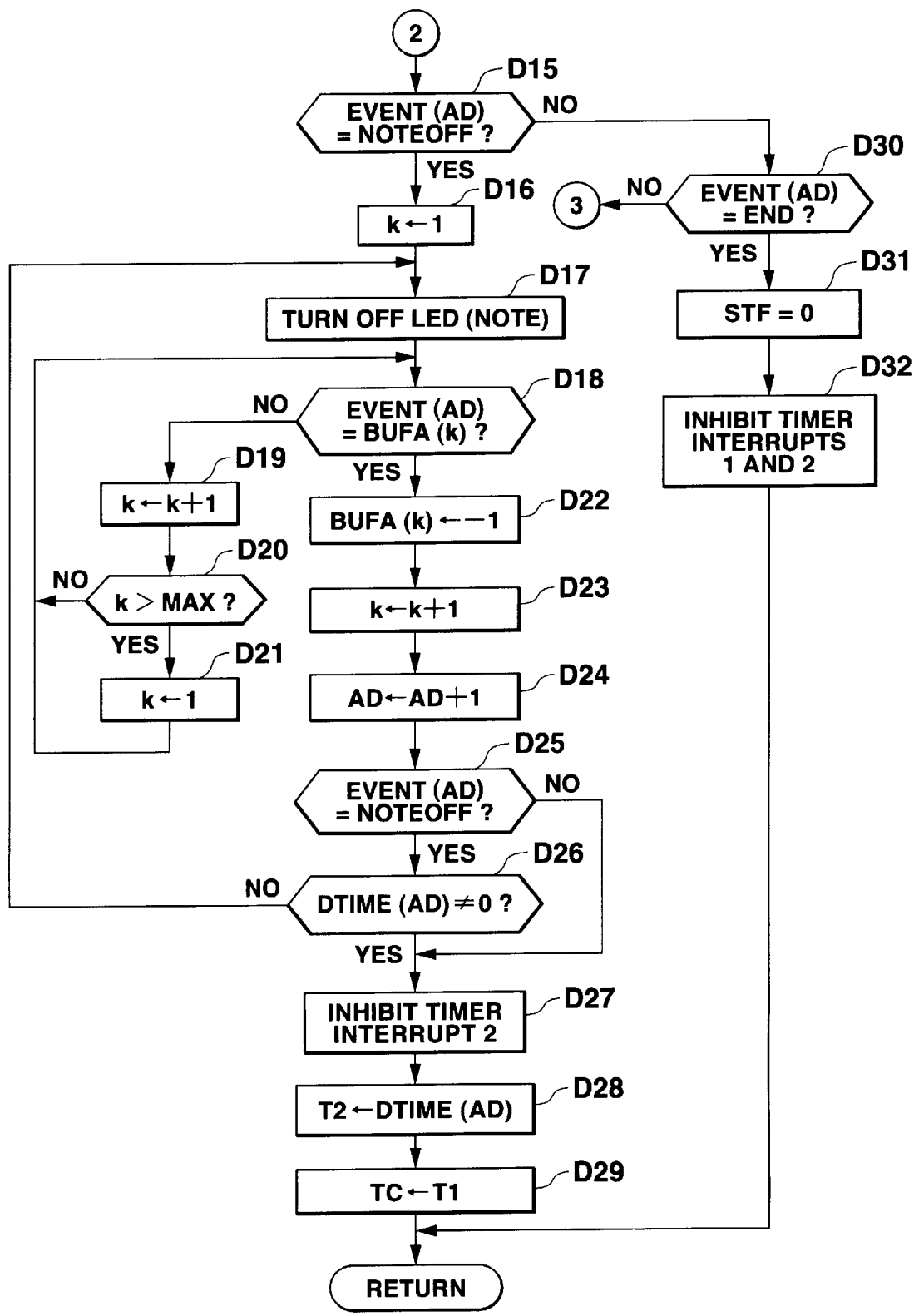

If the block D4 in FIG. 11 does not find that the event data at address AD is a note-on event, block D15 in FIG. 13 checks if the event data is a note-off event. In the affirmative, block D16 sets "1" into the pointer k pointing to an area in BUFA. Block D17 turns off the LED corresponding to the pitch (NOTE) of the note-off event data. Then the routine searches through BUFA for pitch data same as the pitch data NOTE{EVENT(AD)} of the note-off event data. Specifically, block D18 checks if the pitch data of EVENT (AD) is the same as the pitch data of BUFA (k).

In the negative, block D19 increments the pointer k so as to point to the next area in BUFA. Block D20 checks if k is greater than maximum MAX. In the affirmative, block D21 sets k to "1", pointing to the first area. If the k is not greater than MAX (D19) or if the k is set to "1" (D21), the routine returns to the block D18 to check if the pitch data of EVENT (AD) is the same as the pitch data of BUFA (k). In the affirmative, block D22 loads "–1" into the area BUFA (k). The "–1" indicates a note-off changed from note-on. Block D23 increments k to point to the next area in BUFA. Block D24 increments AD. Block D25 checks if the event data specified by AD is also a note-off event with the note-off event of the previous event data.

In the affirmative, block D26 checks if the delta time of the current note-off event data is 0". If this is the case, the current and previous note-off event data constitute chord notes. Then the routine returns to block D17 to turn off the corresponding LED. BUFA (k) is loaded with "–1" (D22). Similarly, the next event data is addressed and checked if it also constitutes a chord note. The process repeats as many as chord notes.

If block D25 does not find that the next event data is a note-off event, or if block D26 does not find the "0" delta time of the next event data (not a chord note), block D27 inhibits the timer interrupt 2. Block D28 loads the delta time of the event data specified by AD into T2. Block D29 loads the real time data of register T1 into register TC. Thus, the register TC is set to the turn-off timing of the LED. Then, the control LED routine A4 returns to the main routine.

Figure 15:
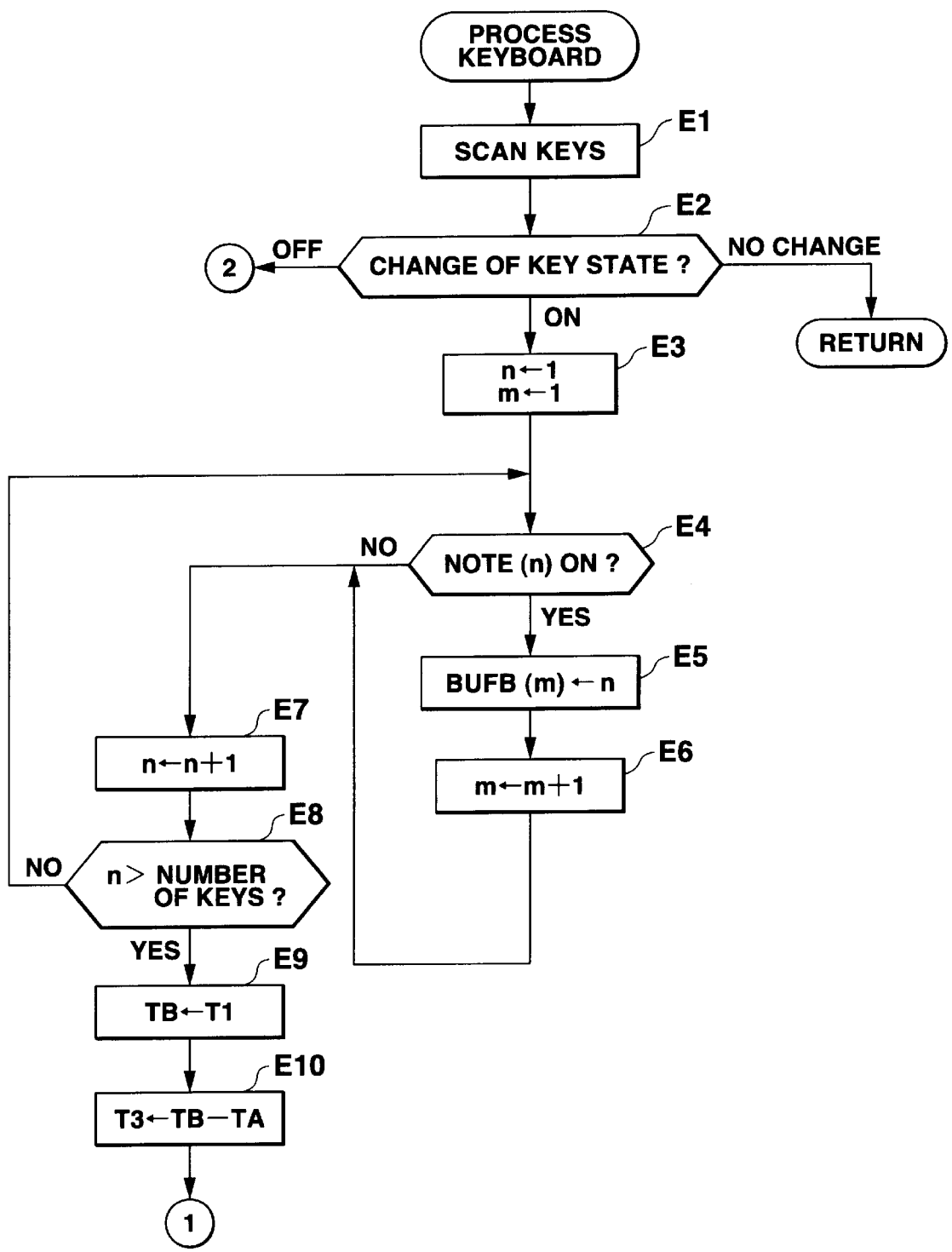
FIGS. 15 to 18 are flow charts of a process keyboard routine in accordance with the first embodiment of the invention.

If block D4 in FIG. 11 has not found that the event data pointed to by AP is a note-on event, and if block D15 in FIG. 15 has not found that the event data is a note-off event, black D30 checks if the event data is an end indicative of end of music. In the affirmative, block D31 sets STF to "0". Block D32 inhibits timer interrupts 1 and 2. Then the routine A4 returns to the main routine.

Figure 14:
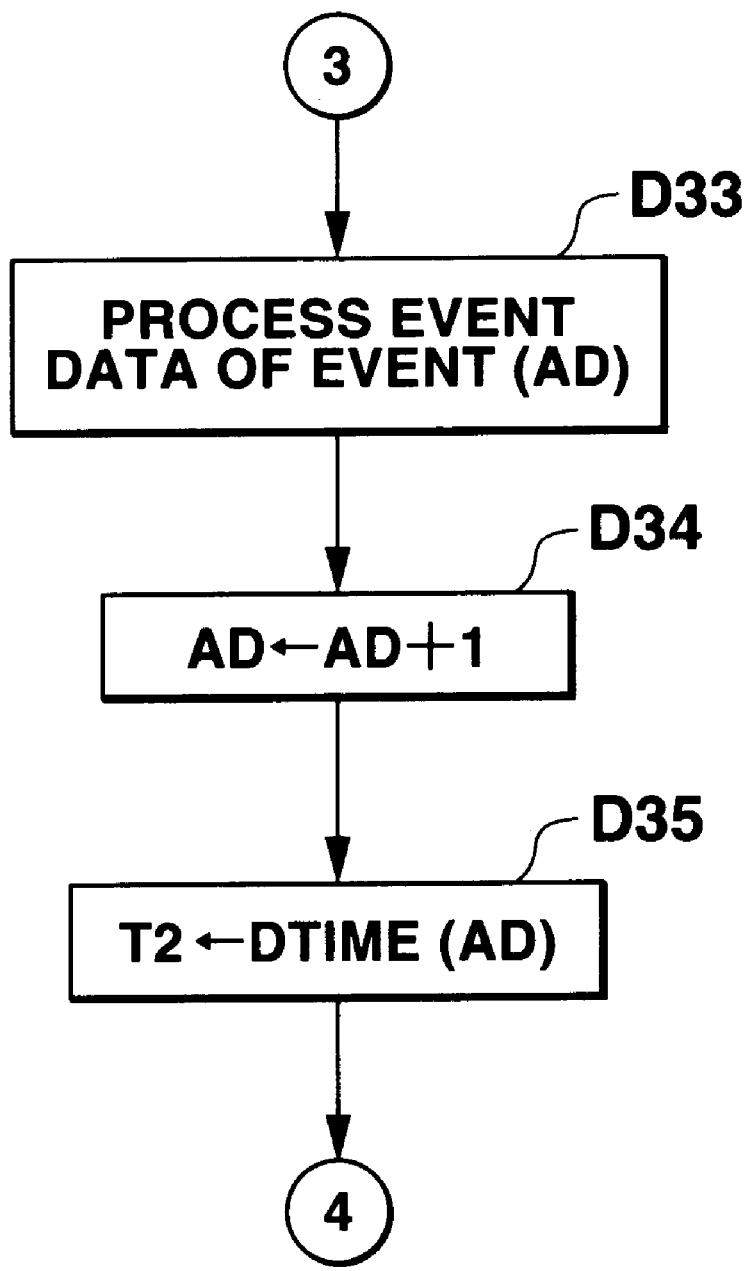

If block D30 finds that the event data is not an end, meaning that the event data is an event, such as program change, other than note-on or note-off event, block D33 in FIG. 14 processes the event data. Block D34 increments AD. Block D35 loads the delta time of the event data pointed to by AD. Then, the routine returns to the block D3 in FIG. 11.

FIGS. 15 to 18 show flow charts of the process keyboard routine A5 in the main routine of FIG. 4. Block E1 scans keys via the key scan interface. Block E2 checks if there is a change of key state to key-on or key-off. If there is no change of key state, the routine A5 directly returns to the main routine. For a change of key state to "ON", block E3 sets key number pointer k to "1" and sets BUFB area pointer m to "1".

Then, the routine executes the following loop to find key number(s) of the key(s) state of which is changed to "ON" while incrementing n. Specifically, block E4 checks if the key of the pitch (NOTE) specified by n is on. In the affirmative, block E5 stores the key number n into BUFB (m). Block E6 increments the pointer m, pointing to the next BUFB area. Then, or if the key is not "on" (block E4), block E7 increments n, pointing to the next key number. Block E8 checks if n has exceeded the number of keys. In the negative, the routine returns to block E4 to check if the key of the pitch (NOTE) specified by n is on.

If the pointer n has exceeded the number of keys (E8), indicative of end of key search, block E9 loads the real time data of T1 into register TB. Thus, TB is set to the key-on timing. Block E10 subtracts TA from TB and loads the result into register T3. Thus, the register T3 is set to the difference between the turn-on timing of LED (note-on timing directed by the navigator) and the actual key-on timing by a player.

Figure 16:
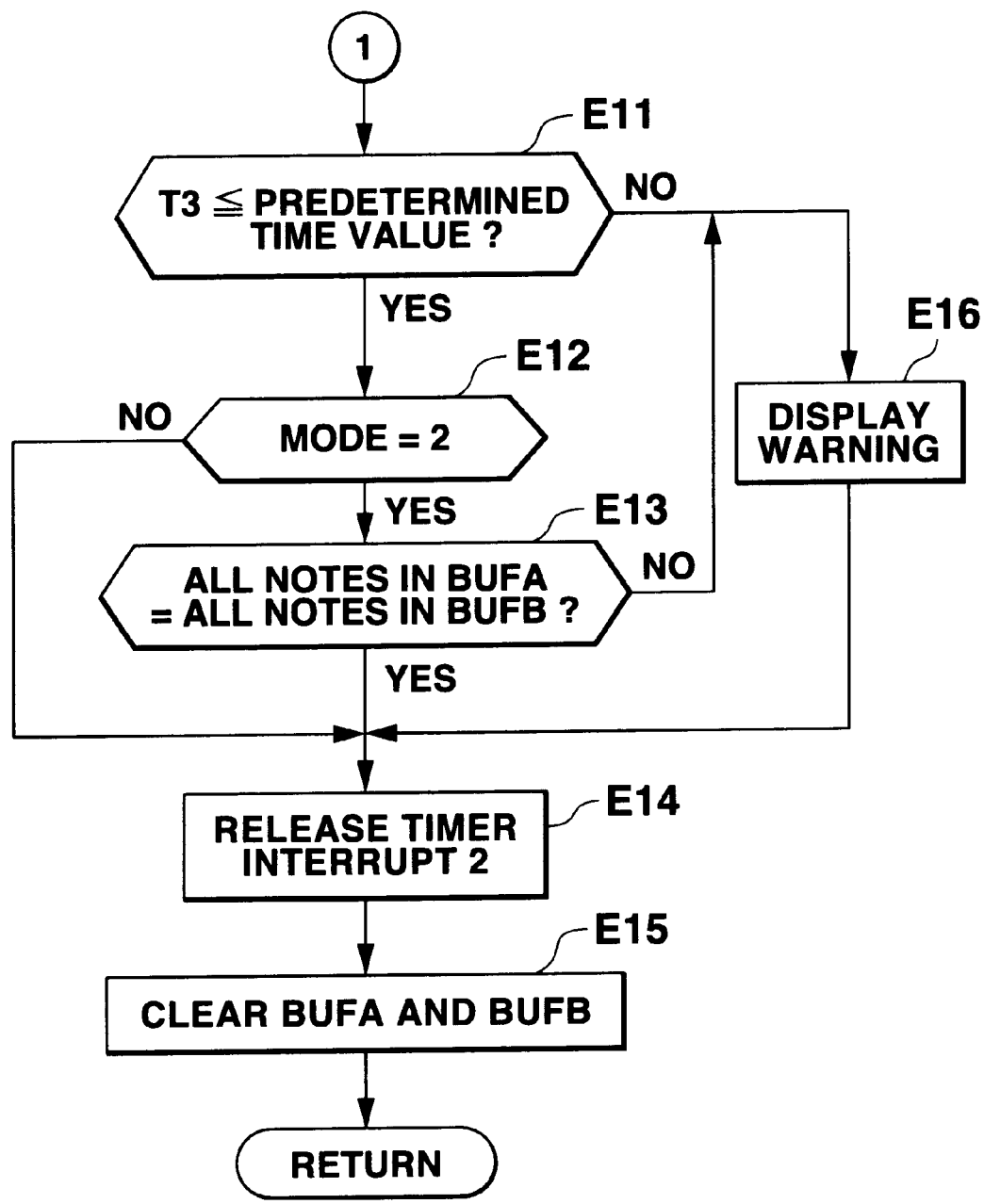

Then the block E11 in FIG. 16 checks if T3 is less than or equal to a predetermined time value. This is the case when the key-on operation (key-pressing) by a player occurs at a correct timing within the predetermined time from the turn-on or navigation timing of LED. The predetermined time value may be determined by considering fingering time, and depend on the tempo and musical skill of a player. In the affirmative, block E12 tests the mode MODE see if the mode MODE is set to "2", indicative of second lesson mode, or "1", indicative of first lesson mode. For MODE=2, block E13 checks if all pitch data in BUFA are identical with all pitch data in BUFB. This means checking if all the navigated keys are correctly pressed.

In the affirmative, the music performance is good in the second lesson mode. Then, the block E14 releases timer interrupt 2, thus restarting music note data progression. Block E15 clears BUFA and BUFB. Then the routine A5 returns to the main routine. For MODE=1 or first lesson mode, block E13 is skipped since, according to the first lesson, the music performance is good for key-on operation timing even if wrong keys (those other than the navigated keys) are operated. Thus, block E14 is directly executed to release timer interrupt 2 so as to restart music note data progression. BUFA and BUFB are cleared (E15). Then the routine A5 returns to the main routine.

If block E11 finds that T3 exceeds the predetermined time value (i.e., the key-on timing is delayed), the block E16 displays the warning. In the second lesson mode, if all pitch data in BUFA are not identical with all pitch data in BUFB (block E13), block E16 displays the warning. After displaying the warning, the routine executes block E14 which releases timer interrupt 2 to restart music note data progression. It executes block E15 to clear BUFA and BUFB and returns to the main routine.

Figure 17:
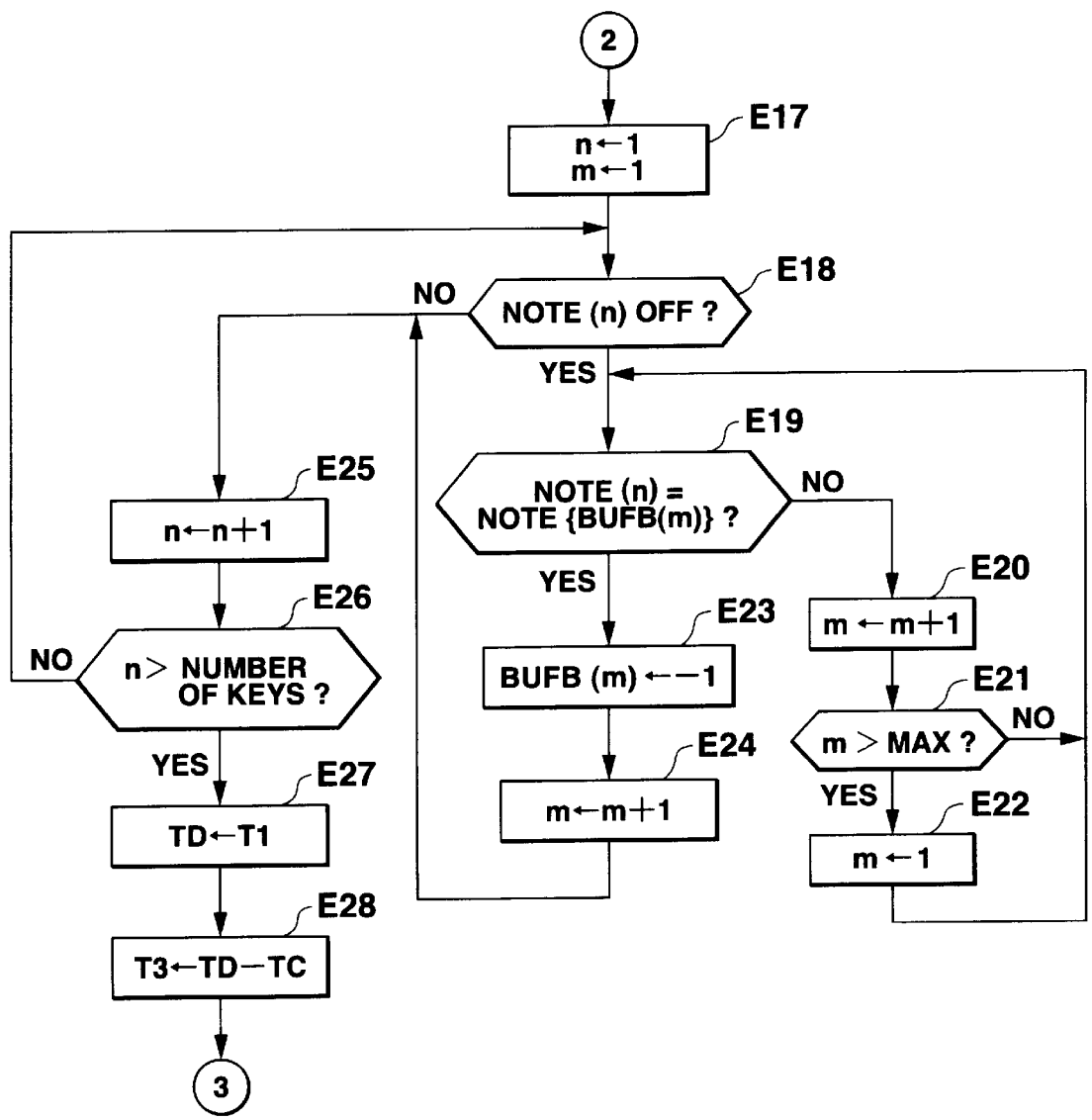

If there is a change of key state to key-off (block E2 in FIG. 15), block E17 in FIG. 17 sets the key number pointer n to "1", and the key-on/off buffer BUFB area pointer m to "1". Then the routine executes the following loop to find key number(s) of the key(s), state of which is changed to "OFF" while incrementing n. Specifically, block E18 checks if the key of the pitch (NOTE) specified by n is off. If this is the case, block E19 checks if the key number NOTE(n) is identical with the key number NOTE{BUFB(m)} stored in BUFB (m) area. In the negative, block E20 increments m, thus pointing to the next BUFB area. Block E21 checks if m exceeds maximum MAX. In the affirmative, block E22 resets m to 1, thus pointing to the first BUFB area.

If m is not greater than MAX (E21), or when m is reset to 1 (E22), the routine executes block E19 to check if the key number NOTE (n) is identical with the key number NOTE {BUFB(m)}. In the affirmative, block E23 loads "−1" into the area BUFB(m). Block E24 increments m, thus pointing to the next BUFB area. Then, or if the key is not "OFF" (block E18), block E25 increments n, pointing to the next key number. Block E26 checks if n has exceeded the number of keys. In the negative, the routine returns to block E18 to check if the key of the pitch (NOTE) specified by n is off.

If the pointer n has exceeded the number of keys (E26), indicative of end of key search, block E27 loads the real time data of T1 into register TD. Thus, TD is set to the key-off timing. Block E28 subtracts TC from TD and loads the result into register T3. Thus, the register T3 is set to the difference between the turn-off timing of LED (note-off timing directed by the navigator) and the actual key-off timing by a player.

Figure 18:
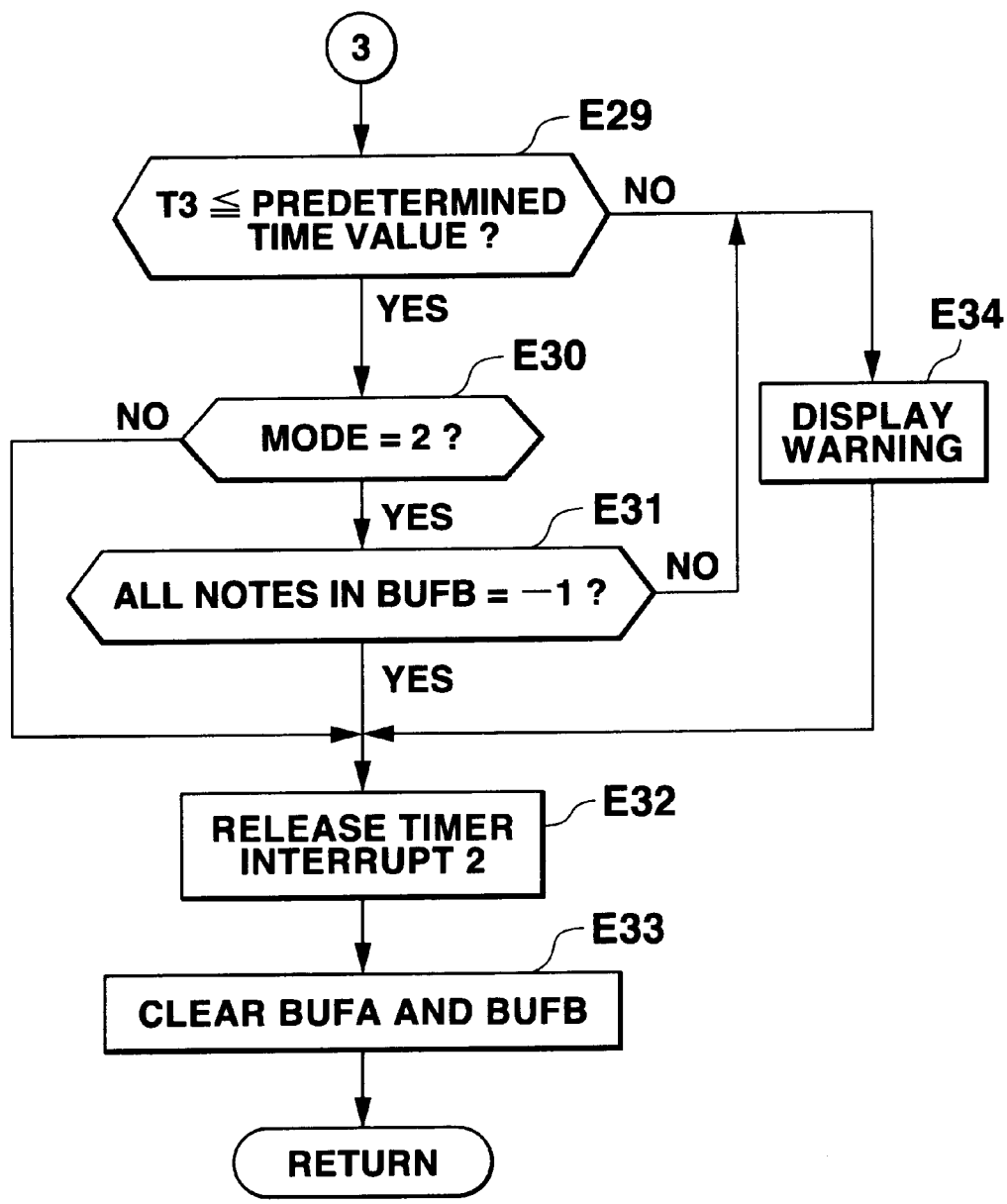

Then the block E29 in FIG. 18 checks if T3 is less than or equal to a predetermined time value. This is the case when the key-off operation (key-releasing) by a player occurs at a correct timing within the predetermined time from the turn-off or navigation timing of LED. In the affirmative, block E30 tests the mode MODE to see if the mode MODE is set to "2", indicative of second lesson mode, or "1", indicative of first lesson mode. For MODE=2, block E31 checks if all data in BUFB are identical with "−1". This means checking if all the navigated keys are correctly released.

In the affirmative, the music performance is good in the second lesson mode. Then, the block E32 releases timer interrupt 2, thus restarting music note data progression. Block E33 clears BUFA and BUFB. Then the routine A5 returns to the main routine. For MODE=1 or first lesson mode, block E31 is skipped since, according to the first lesson, the music performance is good for key-off operation timing even if wrong keys (those other than the navigated keys) are operated. Thus, block E32 is directly executed to release timer interrupt 2 so as to restart music note data progression. BUFA and BUFB are cleared (E33). Then the routine A5 returns to the main routine.

If block E29 finds that T3 exceeds the predetermined time value (i.e., the key-off timing is delayed), the block E34 displays the warning of the delayed key-off. In the second lesson mode, if all pitch data in BUFB are not identical with "−1" (block E31), block E34 displays the warning of the wrong keys. After displaying the warning, the routine executes block E32 which releases timer interrupt 2 to restart music note data progression. It executes block E33 to clear BUFA and BUFB and returns to the main routine.

In this manner, the first embodiment can properly guide a player to play chords, even using, as musical data, serial data for directing operation of operation members, such as SMF, according to which respective event data are serially arranged with time differences.

In the first embodiment, before it controls the note data progression, CPU1 corrects duration of those note data which partially overlap in duration. It may be modified that CPU1 corrects duration of such note data while controlling the note data progression.

In the first embodiment, the music performance training apparatus is applied to a keyboard instrument. This is illustrative only, and the invention can be applied to another instrument, such as a brass instrument. In a brass instrument, operation members take the form of keys, and a plurality of LEDs may be provided so as to correspond to such keys.

The operation of the second embodiment of the music performance training apparatus will now be described. The main routine of CPU1, timer interrupts 1 and 2, and initialize, process switches and load music routines in the main routine in the second embodiment are identical with corresponding parts in the first embodiment. Therefore, further description is omitted. The control LED routine and process keyboard routine of the second embodiment are now described since these routines are different from those of the first embodiment.

FIGS. 19 to 23 show flow charts of the control LED routine A4 in the second embodiment. Block F1 checks the mode flag MODE. If MODE=0, indicative of manual performance mode, the routine directly returns to the main routine. If MODE=1 or 2, indicative of navigation mode, block F2 checks if STF=1, indicative of start navigation. If STF=0, the routine A4 returns to the main routine. If STF=1, block F3 checks if the time register T2 has reached "0", indicative of event time, via the timer interrupt 2 that decrements T2. If T2≠0, not event time, the control LED routine A4 returns to the main routine.

If T2=0, block F4 checks if the event data at address specified by the register AD is note-on. In the affirmative, block F5 in FIG. 20 sets the pointer k pointing to an area in the buffer BUFA to 1. Block F6 turns on the LED corresponding to the pitch (NOTE) of the note-on event data. Block F7 loads the pitch data of NOTE{EVENT CAD)} of the note-on event data pointed to by AD into an area k of the buffer BUFA. Block F8 increments the pointer k so as to point to the next area of BUFA. Block F9 increments the pointer AD so as to point to the next event data.

Then, block F10 check if the next event data EVENT(AD) is also a note-on event. In the affirmative, block F11 checks if the delta time of the next event data is "0". In the affirmative, the note of the next event data and the note of the previous event data constitute chord notes to be played simultaneously. Thus, the routine returns to block F6 to turn on the corresponding LED. The routine repeats the process of blocks F6–F11 as many as notes of a chord.

If the next event data is not a note-on event (F10), or if the delta time of the next event data is not "0" (F11), block F12 inhibits timer interrupt 2, thus stopping the music note data progression to wait for key-on operation. Block F13 loads the delta time DTIME(AD) of the event data pointed to by AD into the register T2. Block F14 loads the real time data of T1 into the time register TA. Thus, the time register TA is set to the turn-on timing of LED.

Figure 21:
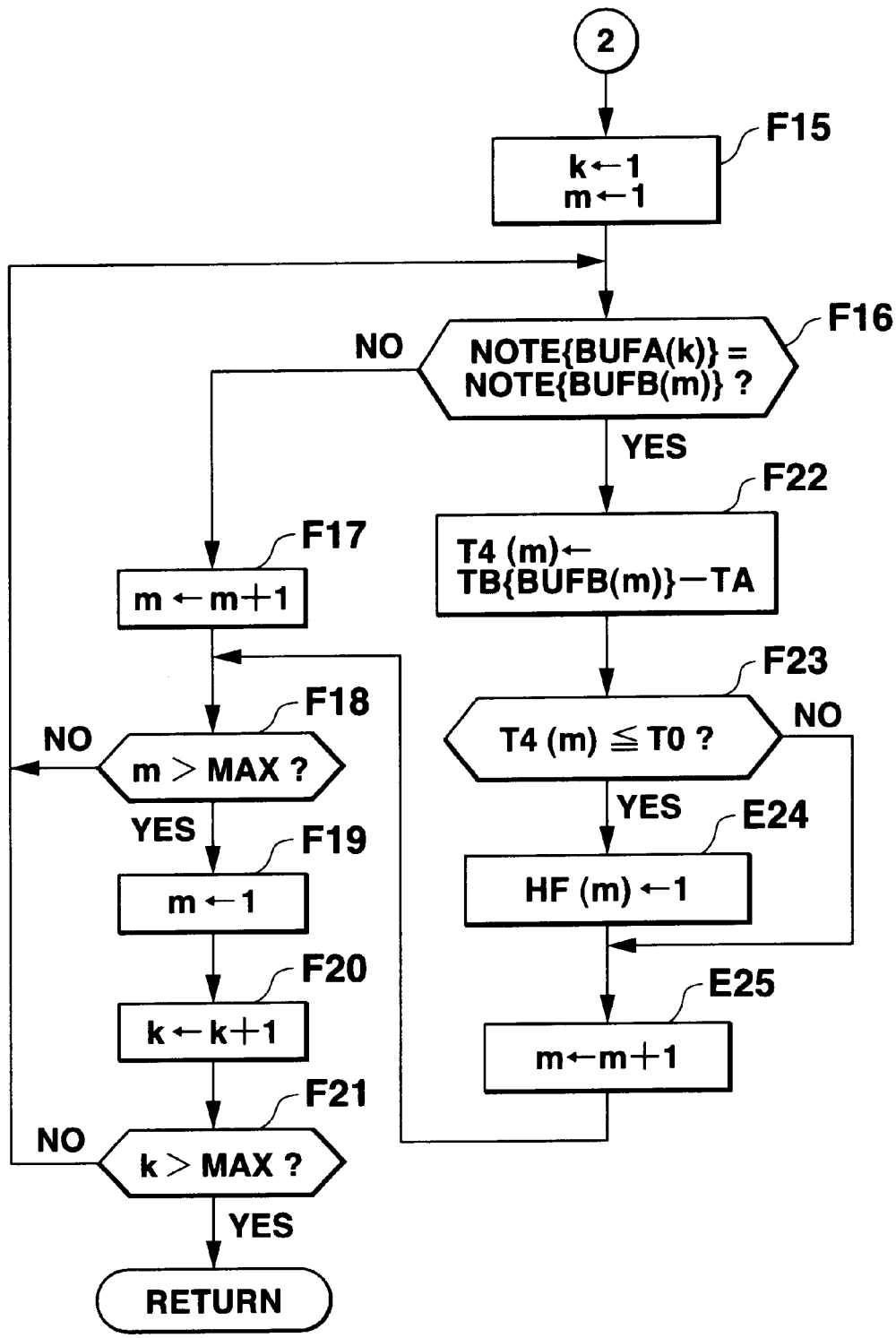

Then, block F15 in FIG. 21 sets the BUFA area pointer k to "1" and BUFB area pointer m to "1". The routine executes the following loop while incrementing k and m. Specifically, block F16 checks if the pitch data NOTE{BUFA(k)} of BUFA(k) is identical with the pitch data NOTE{BUFB(m)} of BUFB(m). This means checking if a key-on operation of a key occurred before the turn-on timing of a LED corresponding to the key.

If the pitch data are not identical, indicating that a key-on operation of a key did not occur before the turn-on timing of the corresponding LED, block F17 increments m, pointing to the next BUFB area. Block F18 checks if m is greater than maximum MAX. In the negative, the routine returns to block F16 to check matching of pitch data. In the affirmative, this indicates that there is no pitch data in BUFB that matches pitch data of BUFA(k). Thus, block F19 sets m to 1, and block F20 increments k. Then block 21 checks if k has exceeded maximum MAX. In the negative, the routine returns to block F16 to check matching of pitch data.

If the pitch data match, indicating that key-on operation of a key occurred before the turn-on timing of the corresponding LED, the block F22 subtracts TA from TB{BUFB(m)} and loads the result into the register T4 (m). Thus, the register T4(m) is set to the time difference between the turn-on timing of LED and the key-on operation of the corresponding key that occurred before the turn-on of the LED. Block F23 checks if T4(m) is equal to or less than a predetermined time value T0.

This is the case when a key-on operation of a key has occurred at a correct timing which is just before the turn-on of the corresponding LED (key-on direction by the navigator). It is assumed that a player has learned performing the music so much that he or she can play the music without the need of waiting for key-on direction by the navigator. On the other hand, if T4 (m) is greater than the predetermined time, it is assumed that the key-on operation occurred at a wrong or prematured timing because of an accident or wrong tempo. When T4 (m) is less than or equal to the predetermined time value, block F24 sets check flag HF (m) to "1", indicative of good performance. After setting HF (m) to 1 or if T4 (m) is found to exceed T0, the routine executes block F25 to increment m, thus pointing to the next BUFB area. Then the routine returns to block F18 to check if m is greater than maximum MAX.

Figure 19:
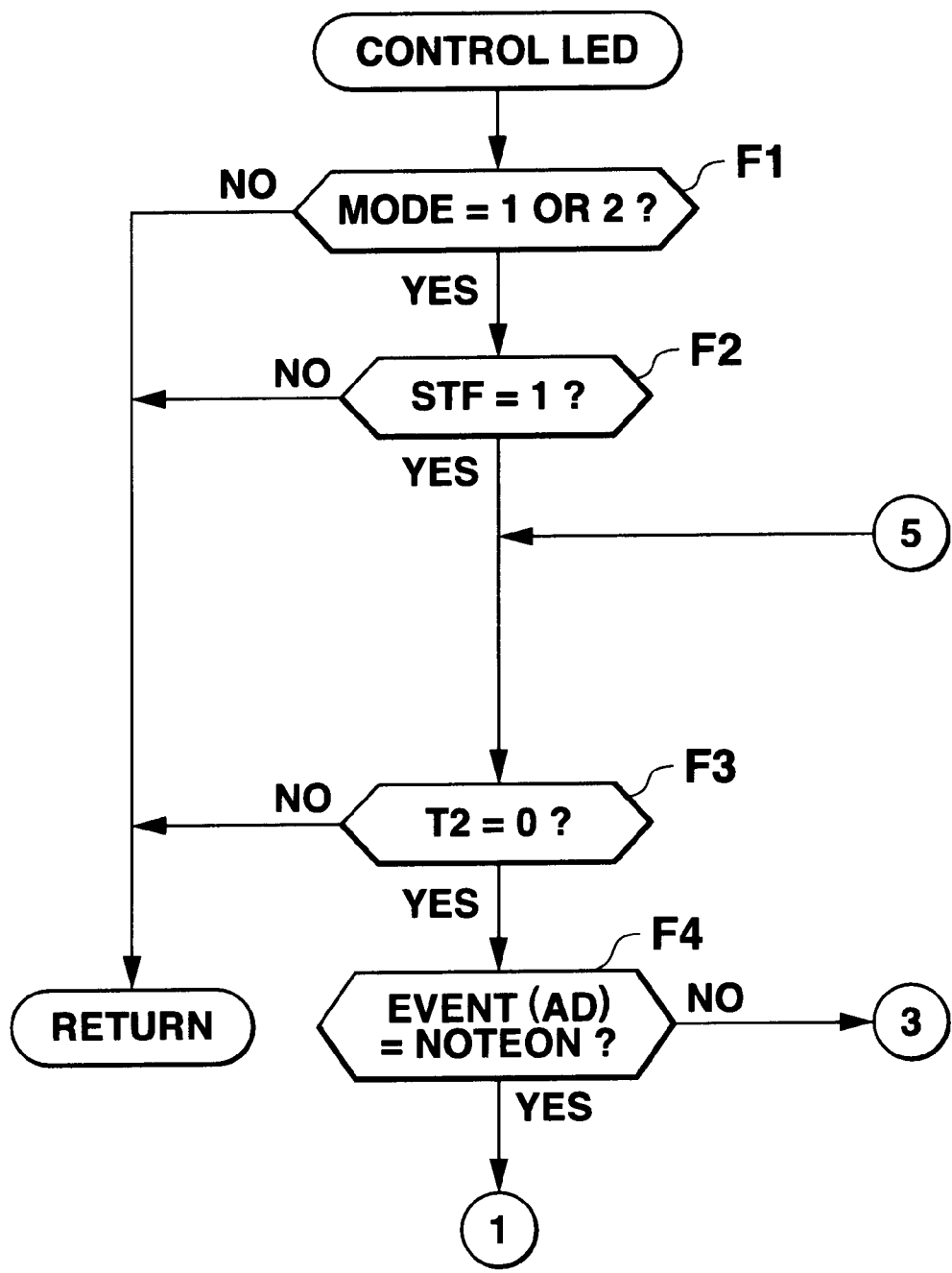
FIGS. 19 to 23 are flow charts of the control LED routine in accordance with the second embodiment of the invention.
Figure 20:
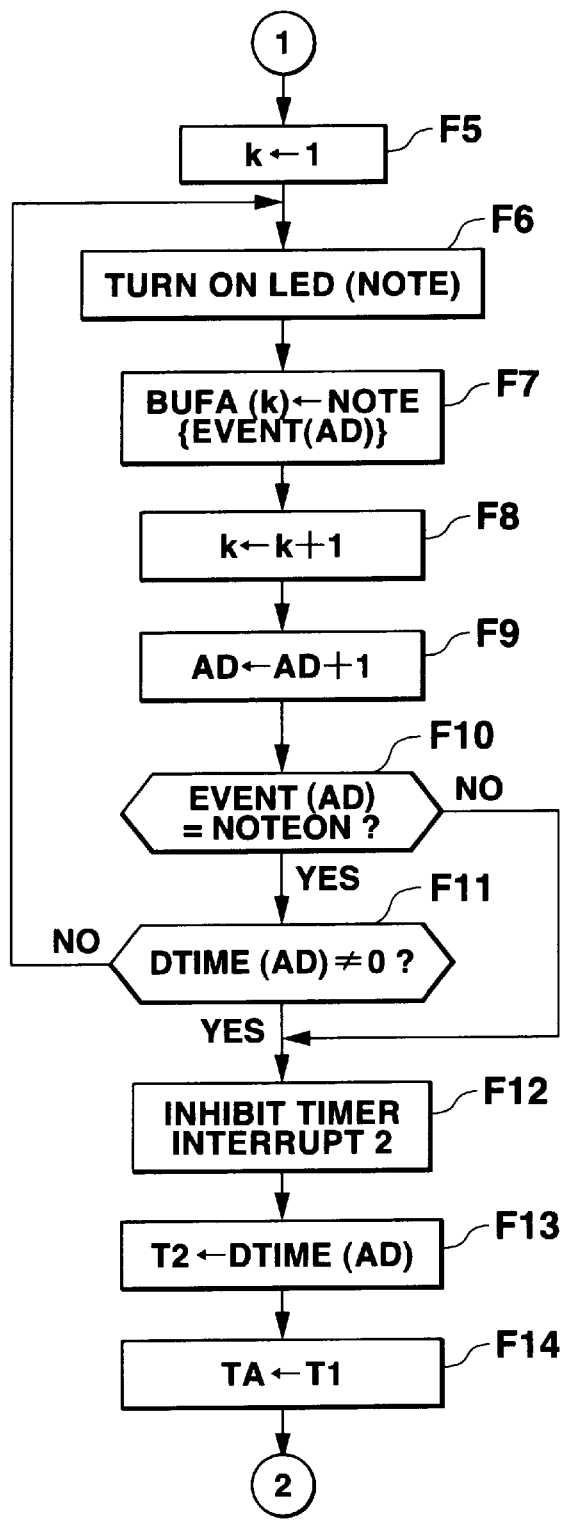
Figure 22:
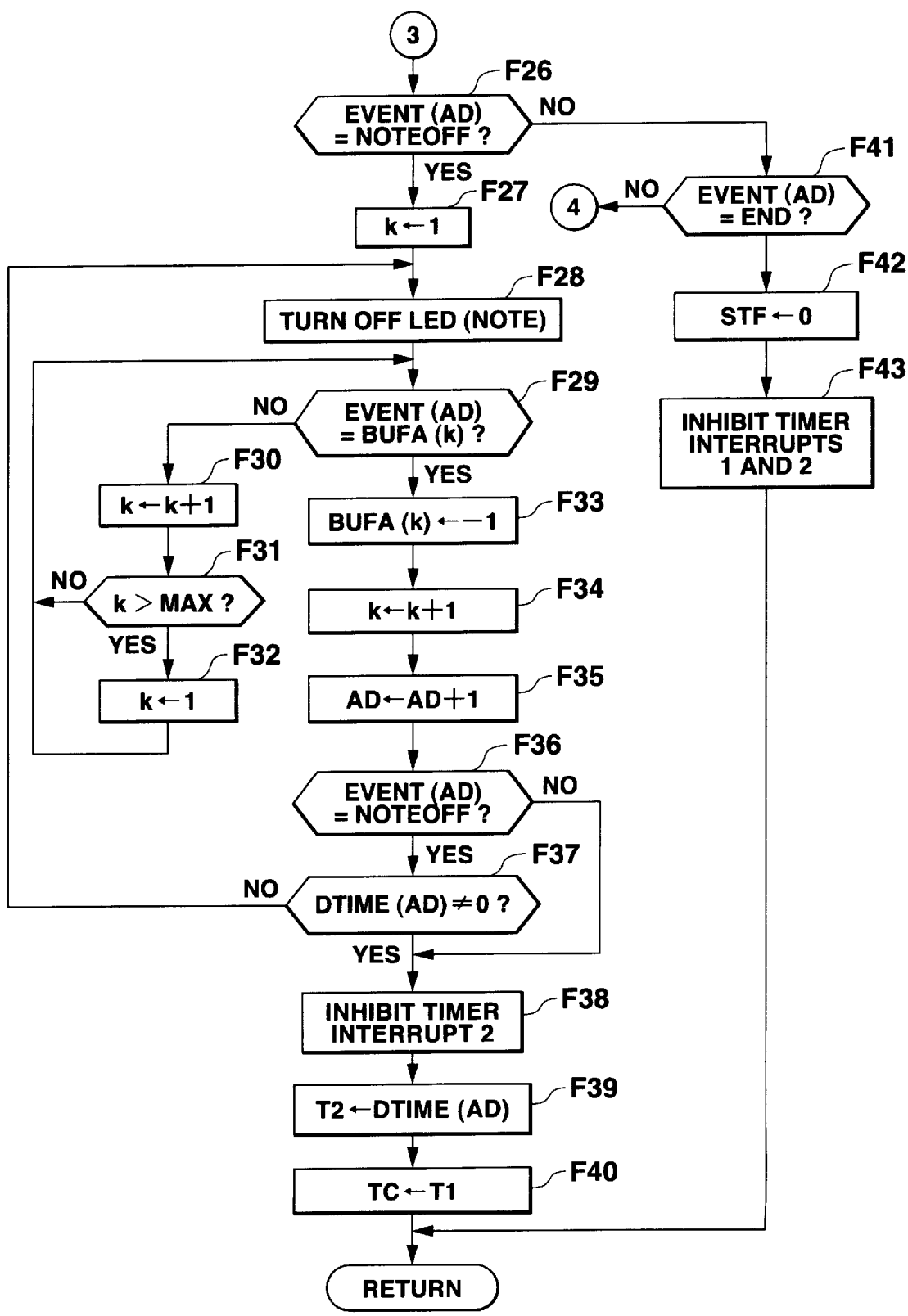

If the block F4 in FIG. 19 does not find that the event data at address AD is a note-on event, block F26 in FIG. 22 checks if the event data is a note-off event. In the affirmative, block F27 sets "1" into the pointer k pointing to an area in BUFA. Block F28 turns off the LED corresponding to the pitch (NOTE) of the note-off event data. Then the routine searches through BUFA for pitch data same as the pitch data NOTE{EVENT(AD)} of the note-off event data. Specifically, block F29 checks if the pitch data of EVENT (AD) is the same as the pitch data of BUFA(k).

In the negative, block F30 increments the pointer k so as to point to the next area in BUFA. Block F31 checks if k is greater than maximum MAX. In the affirmative, block F32 sets k to "1", pointing to the first area. If the k is not greater than MAX(F31) or if the k is set to "1 (F32), the routine returns to the block F29 to check if the pitch data of EVENT(AD) is the same as the pitch data of BUFA(k). In the affirmative, block F33 loads "−1" into the area BUFA (k). The "−1" indicates a note-off changed from note-on. Block F34 increments k to point to the next area in BUFA. Block F35 increments AD. Block B36 checks if the event data specified by AD is also a note-off event with the note-off event of the previous event data.

In the affirmative, block F37 checks if the delta time of the current note-off event data is 0". If this is the case, the current and previous note-off event data constitute chord notes. Then the routine returns to block F28 to turn off the corresponding LED. BUFA (k) is loaded with "−1" (F33). Similarly, the next event data is addressed and checked if it also constitutes a chord note. The process repeats as many as chord notes.

If block F36 does not find that the next event data is a note-off event, or if block F37 does not find the "0" delta time of the next event data (not a chord note), block F38 inhibits the timer interrupt 2, thus stopping the music note progression to wait for key-off operation. Block F39 loads the delta time of the event data specified by AD into T2. Block F40 loads the real time data of register T1 into register TC. Thus, the register TC is set to the turn-off timing of the LED. Then, the control LED routine A4 returns to the main routine.

If block F4 in FIG. 19 has not found that the event data pointed to by AD is a note-on event, and if block F26 in FIG. 22 has not found that the event data is a note-off event, block F41 in FIG. 22 checks if the event data is an end in indicative of end of music. In the affirmative, block F42 sets STF to "0". Block F43 inhibits timer interrupts 1 and 2. Then the routine A4 returns to the min routine.

Figure 23:
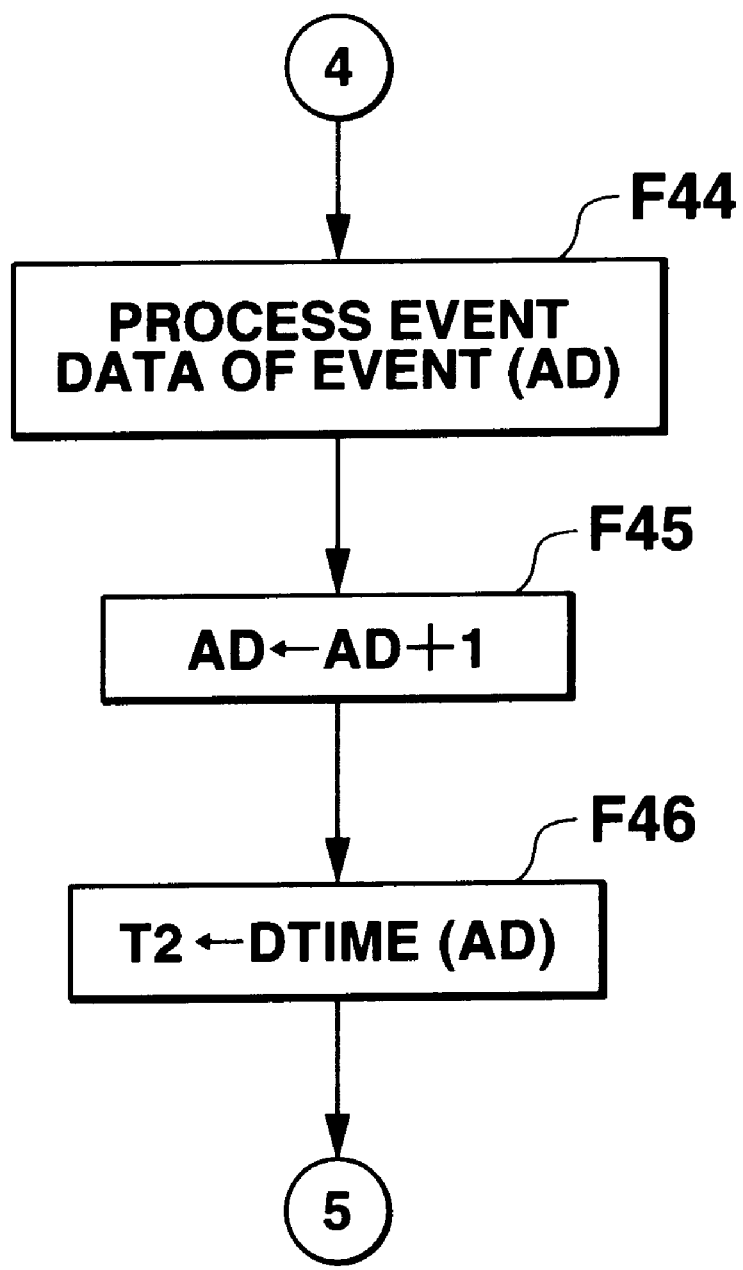
Figure 24:
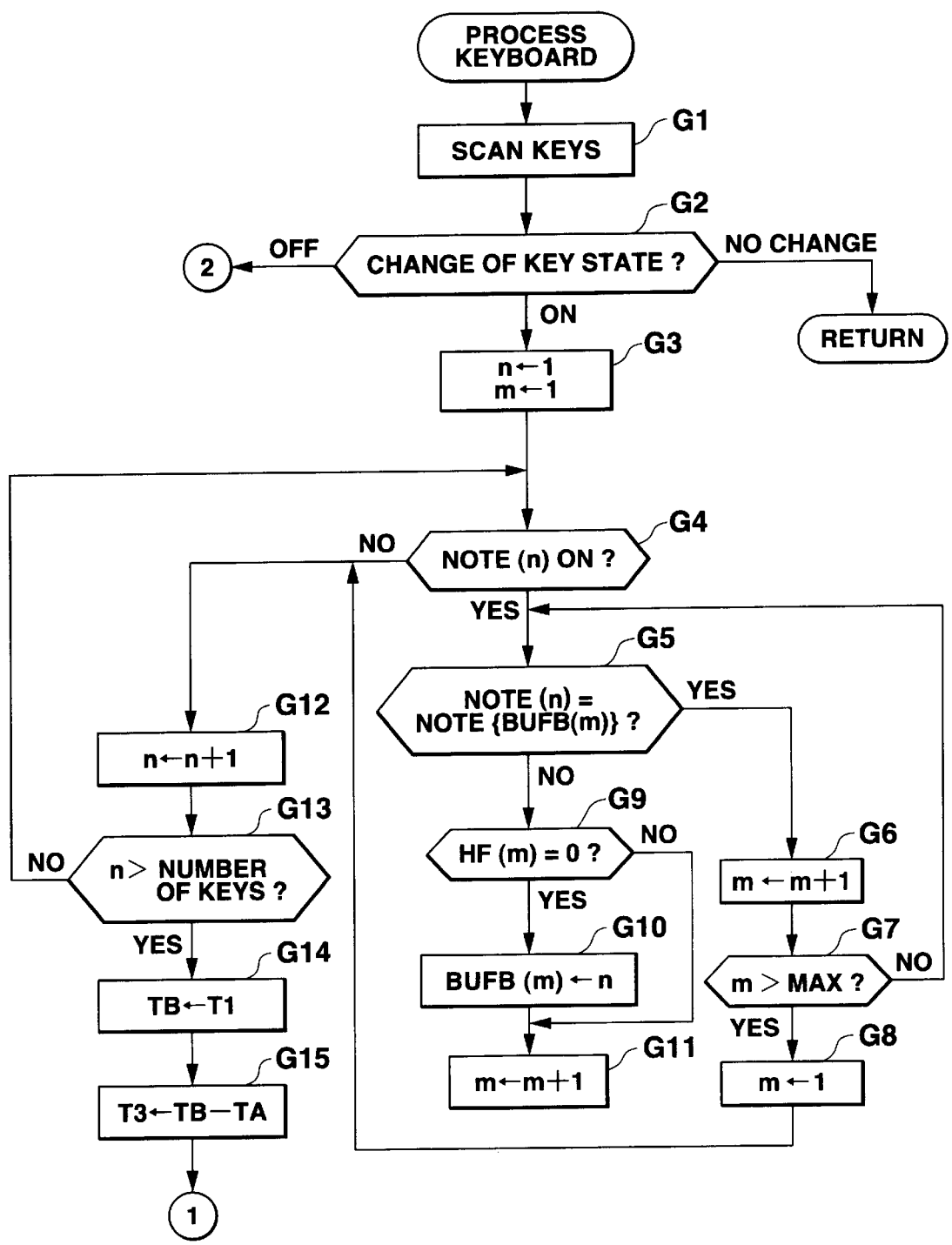
FIGS. 24 to 27 are flow charts of the process keyboard routine in accordance with the second embodiment of the invention.

If block F41 finds that the event data is not an end, meaning that the event data is an event, such as program change, other than note-on or note-off event, block F44 in FIG. 23 processes the event data. Block F45 increments AD. Block F46 loads the delta time of the event data pointed to by AD. Then, the routine returns to the block F3 in FIG. 19.

FIGS. 24 to 27 show flow charts of the process keyboard routine A5 in the main routine of FIG. 4 in accordance with the second embodiment. Block G1 scans keys via the key scan interface. Block G2 checks if there is a change of key state to key-on or key-off. If there is no change of key state, the routine A5 directly returns to the main routine. For a change of key state to "ON", block G3 sets key number pointer k to "1" and sets BUFB area pointer m to "1".

Then, the routine executes the following loop to find key number(s) of the key(s) state of which is changed to "ON" while incrementing n. Specifically, block G4 checks if the key of the pitch (NOTE) specified by n is on. In the affirmative, block G5 checks if the pitch data NOTE (n) is identical with or matches the pitch data NOTE{BUFB(m)} of BUFB(m). If this is the case, block G6 increments m, pointing to the next BUFB area. Block G7 checks if m has exceeded maximum MAX. For m less than or equal to MAX, the routine returns to block G5 to check if the pitch data match. For m greater than MAX, block G8 sets m to "1", pointing to the first BUFB area.

Mismatch of pitch data (block G5) indicates that BUFB has stored pitch data different from the pitch data NOTE (n). In this case, block G9 checks if check flag HF (m) pointed to by m is "0". This is the case when the stored pitch data BUFB (m) is the one of a prematured key-on operation. Thus, block G10 updates BUFB (m) to the key number n of a current key-on operation. Block G11 increments m, pointing to the next BUFB area. HF (m)=1 at block G9 indicates that the stored pitch data BUFB (m) is correct. Thus the routine skips the block G10 and executes block G11 to increment m to the next BUFB area.

After m is incremented or if the key of pitch data NOTE (n) specified by n is not "ON" (G4), block G12 increments n, pointing to the next key number. Block G13 checks if n has exceeded the number of keys. In the negative, the routine returns to block G4 to check if the key of the pitch (NOTE) specified by n is on. If the pointer n has exceeded the number of keys (G13), indicative of end of key search, block G14 loads the real time data of T1 into register TB {BUFB (m−1)} corresponding to BUFB (m) that has stored new pitch data. Thus, TB is set to the key-on timing. Block G15 subtracts TA from TB and loads the result into register T3. Thus, the register T3 is set to the difference between the turn-on timing of LED (note-on timing directed by the navigator) and the key-on timing by a player.

Figure 25:
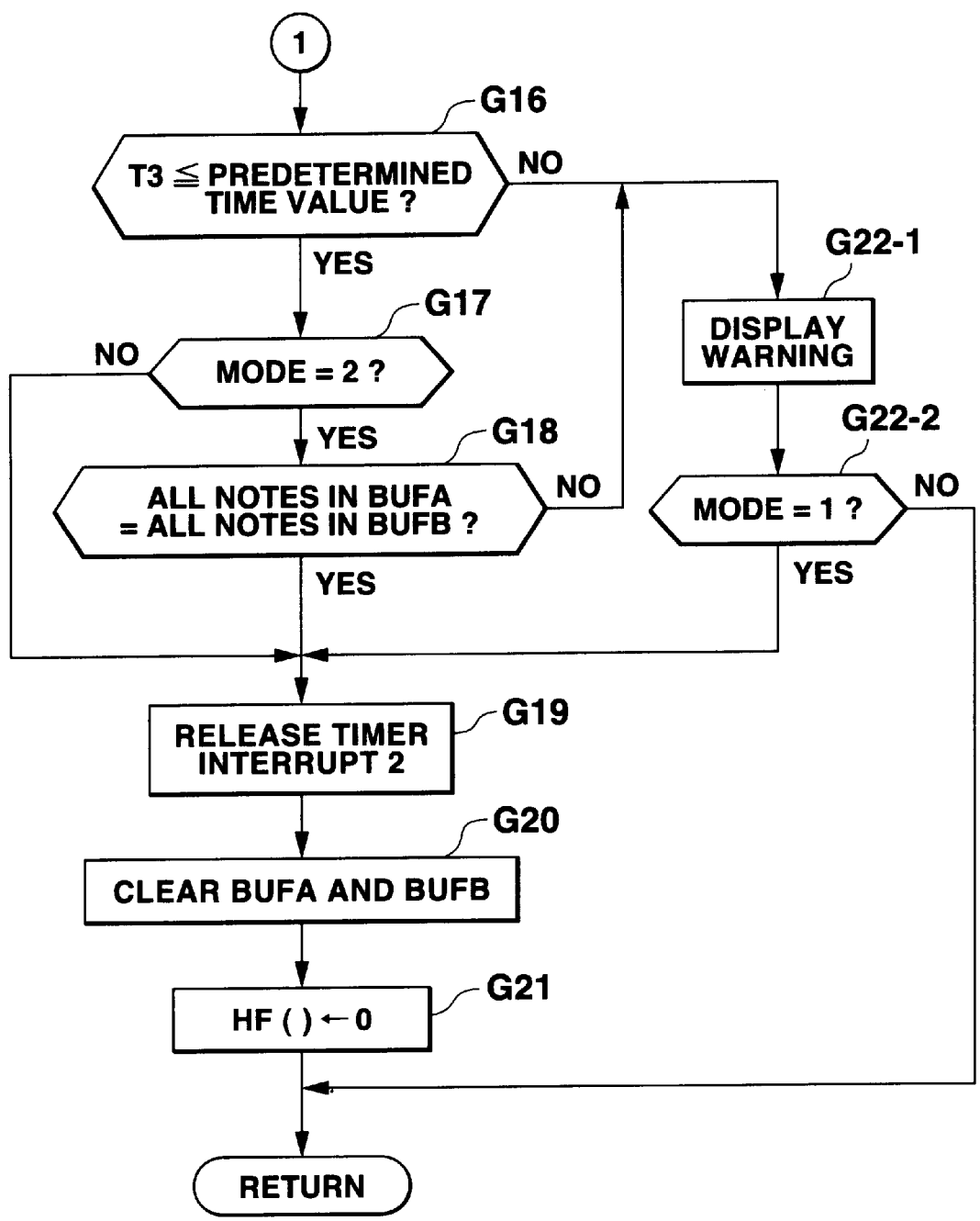

Then the block G16 in FIG. 25 checks if T3 is less than or equal to a predetermined time value. This is the case when the key-on operation (key-pressing) by a player occurs at a correct timing within the predetermined time from the turn-on or navigation timing of LED. The predetermined time value may be determined by considering fingering time; and depend on the tempo and musical skill of a player. In the affirmative, block G17 tests the mode MODE see if the mode MODE is set to "2", indicative of second lesson mode, or "1", indicative of first lesson mode. For MODE=2, block G18 checks if all pitch data in BUFA are identical with all pitch data in BUFB. This means checking if all the navigated keys are correctly pressed.

In the affirmative, the music performance is good in the second lesson mode. Then, the block G19 releases timer interrupt 2, thus restarting music note data progression. Block G20 clears BUFA and BUFB. Block G21 resets all HF flags, HF (1) to HF (MAX) to "0". Then the routine A5 returns to the main routine. For MODE=1 or first lesson mode, block G18 is skipped since, according to the first lesson, the music performance is good for key-on operation timing even if wrong keys (those other than the navigated keys) are operated. Thus, block G19 is directly executed to release timer interrupt 2 so as to restart music note data progression. Flags HF (1) to HF (MAX) are all cleared (block G21). Then the routine A5 returns to the main routine.

If block G16 finds that T3 exceeds the predetermined time value (i.e., the key-on timing is delayed), the block G22-1 displays the warning of the delay. In the second lesson mode, if all pitch data in BUFA are not identical with all pitch data in BUFB (block G18), block G22-1 displays the warning of the wrong keys. After displaying the warning, block G22-2 checks lesson mode MODE. In the first lesson mode, flag G19 releases timer interrupts 1 and 2. Block G20 clears BUFA and BUFB. Block G21 resets flags HF (1) to HF (MAX) to "0". Then routine returns to the main routine. In the second lesson mode (G22-2), the routine directly returns to the main routine.

Figure 26:
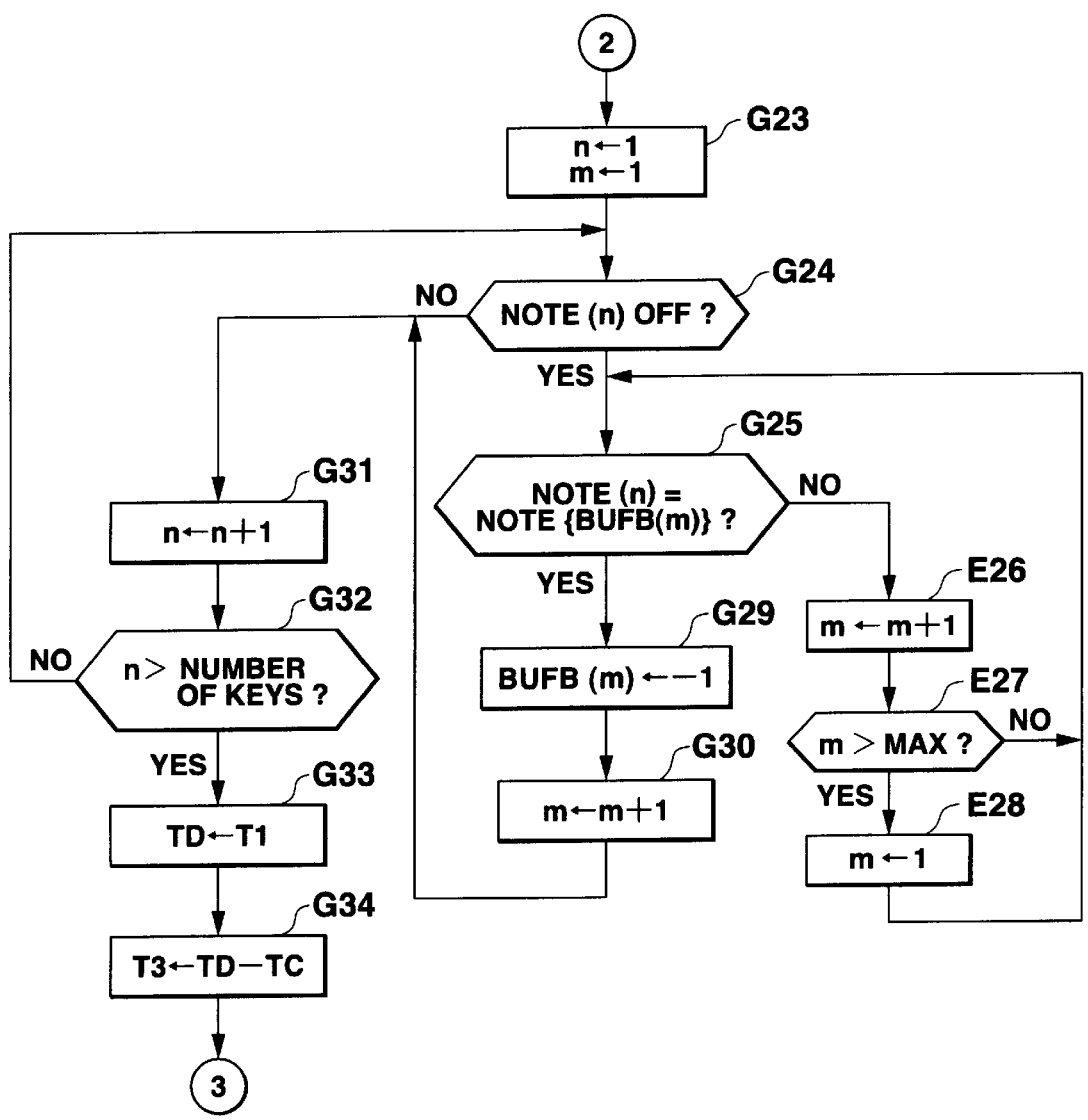

If there is a change of key state to key-off (block G2 in FIG. 24), block G23 in FIG. 26 sets the key number pointer n to "1", and the key-on/off buffer BUFB area pointer m to "1". Then the routine executes the following loop to find key number(s) of the key(s), state of which is changed to "OFF" while incrementing n. Specifically, block G24 checks if the key of the pitch (NOTE) specified by n is off. If this is the case, block G25 checks if the key number NOTE(n) is identical with the key number NOTE{BUFB(m)} stored in BUFB (m) area. In the negative, block G26 increments m, thus pointing to the next BUFB area. Block G27 checks if m exceeds maximum MAX. In the affirmative, block G28 resets m to 1, thus pointing to the first BUFB area.

If m is not greater than MAX (G27), or when m is reset to 1 (G28), the routine executes block G25 to check if the key number NOTE (n) is identical with the key number NOTE {BUFB(m)}. In the affirmative, block G29 loads "−1" into the area BUFB(m). Block G30 increments m, thus pointing to the next BUFB area. Then, or if the key is not "OFF" (block G24), block G31 increments n, pointing to the next key number. Block G32 checks if n has exceeded the number of keys. In the negative, the routine returns to block G24 to check if the key of the pitch (NOTE) specified by n is off.

If the pointer n has exceeded the number of keys (G32), indicative of end of key search, block G33 loads the real time data of T1 into register TD. Thus, TD is set to the key-off timing. Block G34 subtracts TC from TD and loads the result into register T3. Thus, the register T3 is set to the difference between the turn-off timing of LED (note-off timing directed by the navigator) and the actual key-off timing by a player.

Figure 27:
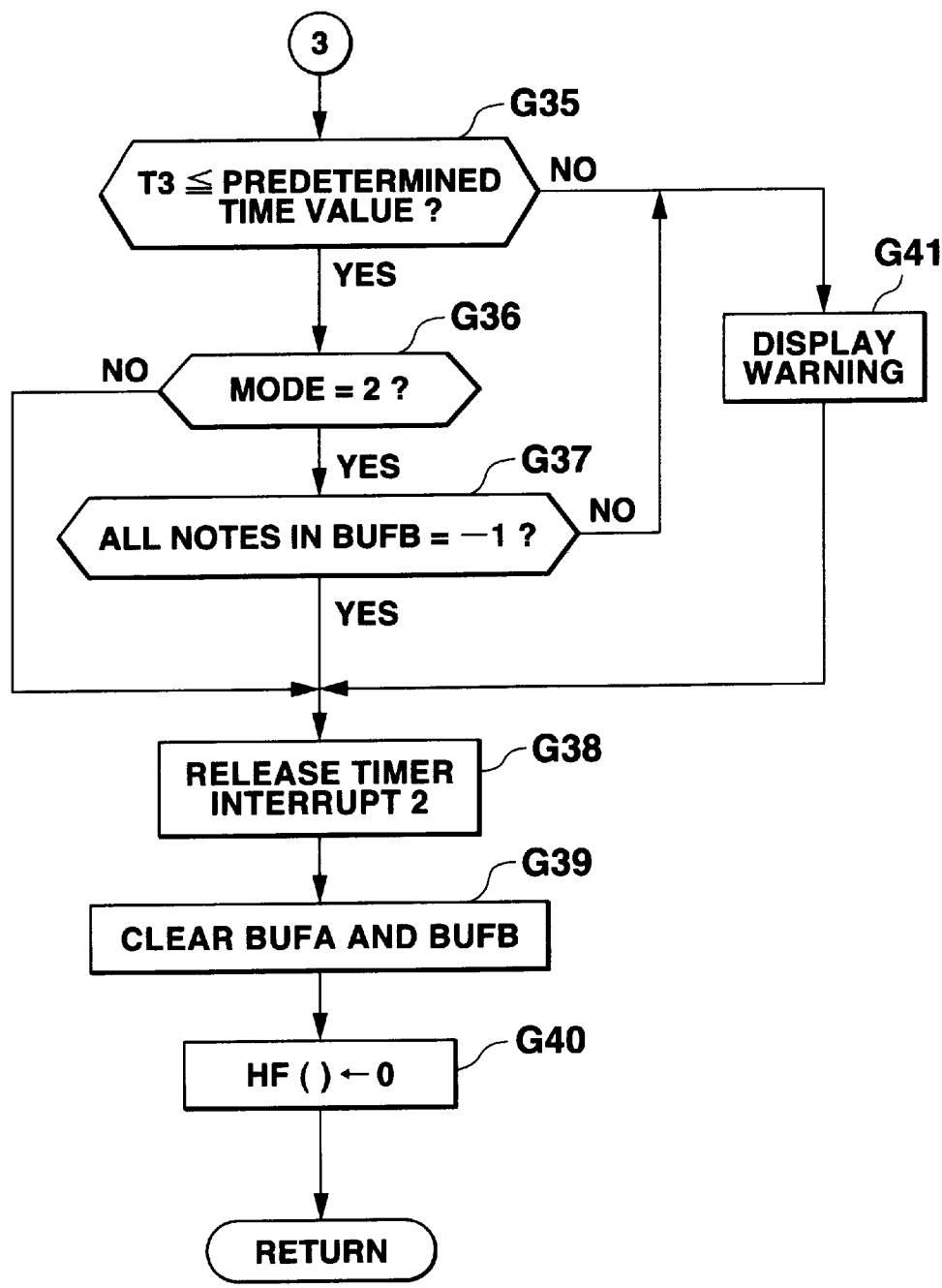

Then the block G35 in FIG. 27 checks if T3 is less than or equal to a predetermined time value. This is the case when the key-off operation (key-releasing) by a player occurs at a correct timing within the predetermined time from the turn-off or navigation timing of LED. In the affirmative, block G36 tests the mode MODE to see if the mode MODE is set to "2", indicative of second lesson mode, or "1", indicative of first lesson mode. For MODE=2, block G37 checks if all data in BUFB are identical with "−1". This means checking if all the navigated keys are correctly released.

In the affirmative, the music performance is good in the second lesson mode. Then, the block G38 releases timer interrupt 2, thus restarting music note data progression. Block G39 clears BUFA and BUFB. Block G40 resets all HF flags HF (1) to HF (MAX) to "0". Then the routine A5 returns to the main routine. For MODE=1 or first lesson mode, block G37 is skipped since, according to the first lesson, the music performance is good for key-off operation timing even if wrong keys (those other than the navigated keys) are operated. Thus, block G38 is directly executed to release timer interrupt 2 so as to restart music note data progression. BUFA and BUFB are cleared (G39). Flags HF (1) to HF (MAX) are all reset to "0" (G40). Then the routine A5 returns to the main routine.

If block G35 finds that T3 exceeds the predetermined time value (i.e., the key-off timing is delayed), the block G41 displays the warning of the delayed key-off. In the second lesson mode, if all pitch data in BUFB are not identical with "−1" (block G37), block G41 displays the warning of the wrong keys. After displaying the warning, the routine executes block G38 which releases timer interrupt 2 to restart music note data progression. It executes block G39 to clear BUFA and BUFB, and executes block G40 which resets flags HF (1) to HF (MAX) to "0". Then it returns to the main routine.

In accordance with the second embodiment, CPU1 determines that any key operation that occurred at a timing within a predetermined time to the turn-on timing of LEDs corresponding to a plurality keys is correct in the first lesson mode. In the second lesson mode, it determines that key operation of a plurality of keys that occurred at a timing within a predetermined time to the turn-on timing of LEDs corresponding to the plurality of keys is correct.

In this manner, the second embodiment can properly guide a player to play chords or operate a plurality of keys at the same time, even using, as musical data, serial data for directing operation of operation members, such as SMF, according to which note data are serially arranged with time differences.

The first and second embodiments are applied to an apparatus which runs a music performance training program stored in memory such as ROM. This is illustrative only, and any other computer-readable recording medium (e.g., floppy disk, CD) capable of having a music performance training program, such as the one according to the shown flow charts stored thereon may be used. Any suitable information processing apparatus (e.g., PC) may be used to read and run such a music performance training.

What is claimed is:

1. An apparatus for training music performance which comprises:
   a plurality of operation members corresponding to a plurality of pitches;
   a plurality of light emitting elements corresponding to the plurality of operation members;
   music data providing means for providing a succession of note data each representative of pitch, note-on timing and duration;
   data correcting means for correcting those note data in the succession of note data which partially overlap in duration so as to completely overlap in duration by correcting at least one of their note-on timings and durations; and
   control means for controlling those light emitting elements in the plurality of light emitting elements which correspond to pitches of the corrected note data so as to emit light at note-on timings of the corrected note data.

2. The apparatus of claim 1, wherein said note data comprises note-on event data including pitch data and note-on timing data, and note-off event data including the pitch data and note-off timing data, and wherein said duration of said note data is defined by a difference between said note-on timing data and said note-off timing data.

3. The apparatus of claim 1 further comprising:
   performance checking means, responsive to respective ones of said light emitting elements being turned on at a turn-on timing under the control of said control means, for checking whether respective ones of said operation members corresponding to said turned on light emitting elements are operated at a timing within a predetermined time from said turn-on timing; and
   warning means for displaying a warning when said performance checking.

4. The apparatus of claim 2 further comprising:
   performance checking means, responsive to respective ones of said light emitting elements being turned on at a turn-on timing under the control of said control means, for checking whether respective ones of said operation members corresponding to said turned on light emitting elements are operated at a timing within a predetermined time from said turn-on timing; and
   warning means for displaying a warning when said performance checking.

5. The apparatus of claim 1 further comprising:
   performance checking means, responsive to respective ones of said light emitting elements being turned on at a turn-on timing under the control of said control means, for checking whether respective ones of said operation members corresponding to said turned on light emitting elements are operated at one of a timing within a predetermined time from said turn-on timing and a timing within a predetermined time to said turn-on timing; and
   warning means for displaying a warning when said performance checking.

6. The apparatus of claim 2 further comprising:
   performance checking means, responsive to respective ones of said light emitting elements being turned on at a turn-on timing under the control of said control means, for checking whether respective ones of said operation members corresponding to said turned on light emitting elements are operated at one of a timing within a predetermined time from said turn-on timing and a timing within a predetermined time to said turn-on timing; and
   warning means for displaying a warning when said performance checking.

7. A recording medium having a music performance training program stored thereon for causing a computer to:
   provide a succession of note data each representative of pitch, note-on timing and duration;
   correct those note data in the succession of note data which partially overlap in duration so as to completely overlap in duration; and
   control a plurality of light emitting elements corresponding to a plurality of pitches such that those light emitting elements corresponding to pitches of the corrected note data emit light at note-on timings of the corrected note data.

* * * * *